United States Patent
Zhang et al.

(10) Patent No.: US 12,441,791 B2
(45) Date of Patent: *Oct. 14, 2025

(54) ANTIBODIES FOR TREATING MALIGNANT TUMORS AND USES THEREOF

(71) Applicant: SHENZHEN UNIVERSITY, Guangdong (CN)

(72) Inventors: Suping Zhang, Guangdong (CN); Thomas James Kipps, Guangdong (CN); Liufeng Wu, Guangdong (CN); Jianchao Zhang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 228 days.

This patent is subject to a terminal disclaimer.

(21) Appl. No.: 17/369,989

(22) Filed: Jul. 8, 2021

(65) Prior Publication Data

US 2021/0380688 A1    Dec. 9, 2021

Related U.S. Application Data

(63) Continuation of application No. PCT/CN2019/130493, filed on Dec. 31, 2019.

(30) Foreign Application Priority Data

Jan. 8, 2019 (CN) .......................... 201910015048.2

(51) Int. Cl.
| | | |
|---|---|---|
| *C07K 16/28* | (2006.01) | |
| *A61K 39/00* | (2006.01) | |
| *C07K 14/705* | (2006.01) | |
| *C07K 14/725* | (2006.01) | |
| *G01N 33/68* | (2006.01) | |

(52) U.S. Cl.
CPC ...... *C07K 16/2803* (2013.01); *C07K 14/7051* (2013.01); *C07K 14/70517* (2013.01); *C07K 14/70578* (2013.01); *G01N 33/68* (2013.01); *A61K 2039/505* (2013.01); *C07K 2317/24* (2013.01); *C07K 2317/622* (2013.01); *C07K 2317/732* (2013.01); *C07K 2319/03* (2013.01); *G01N 2333/70503* (2013.01)

(58) Field of Classification Search
None
See application file for complete search history.

(56) References Cited

U.S. PATENT DOCUMENTS 8,409,577 B2    4/2013    Thompson et al.

FOREIGN PATENT DOCUMENTS

| CN | 107709359 A | 2/2018 | |
|---|---|---|---|
| CN | 107847596 A | 3/2018 | |
| TW | 201831505 A | 9/2018 | |
| WO | WO-2016094837 A2 * | 6/2016 | ......... A61K 31/4025 |
| WO | 2016142768 A1 | 9/2016 | |
| WO | 2017127702 A1 | 7/2017 | |
| WO | 2017197234 A1 | 11/2017 | |
| WO | 2018136570 A1 | 7/2018 | |
| WO | 2018217799 A1 | 11/2018 | |
| WO | 2018218207 A1 | 11/2018 | |

OTHER PUBLICATIONS

Pechmann, Sebastian; Frydman, Judith (2015). Conservative and non-conservative amino acid substitutions.. 2015. PLOS Computational Biology. Dataset. https://doi.org/10.1371/journal.pcbi.1003674. t001. (Year: 2015).*

Nerreter, T; Peng, H; Rader, C; Grawunder, U; Einsele, H; Hudecek, M, "ROR2 is a novel target for CAR T cells in breast cancer", Oncology Research and Treatment, 2017, vol. 40, p. 130.

Ina Hellmann, Lorenz Waldmeier, Marie-Chirstine Bannwarth-Escher, Kseniya Maslova, Fabian I. Wolter, Ulf Grawunder and Roger R. Beerli, "Novel Antibody Drug Conjugates Targeting Tumor-Associated Receptor Tyrosine Kinase ROR2 by Functional Screening of Fully Human Antibody Libraries Using Transpo-mAb Display on Progenitor B Cells", Frontiers in Immunology, Nov. 2, 2018, vol. 9, Article 2490, pp. 1-16, doi: 10.3389/fimmu.2018. 02490.

Haiyong Peng, Thomas Nerreter, Jing Chang, Junpeng Qi, Xiuling Li, Pabalu Karunadharma, Gustavo Martinez, Mohammad Fallahi, Jo Soden, Jim Freeth, Roger R. Beerli, Ulf Grawunder, Michael Hudecek, Christoph Rader, "Mining Naive Rabbit Antibody Repertoires by Phage Display for Monoclonal Antibodies of Therapeutic Utility", Journal of Molecular Biology, Sep. 15, 2017, vol. 429, pp. 1-53, doi:10.1016/j.jmb.2017.08.003.

International Search Report in corresponding PCT Application No. PCT/CN2019/130493, dated Mar. 27, 2020; and Written Opinion of the International Searching Authority in corresponding PCT Application No. PCT/CN2019/130493, dated Mar. 27, 2020.

* cited by examiner

*Primary Examiner* — Daniel E Kolker
*Assistant Examiner* — Maureen Varina Driscoll

(57) ABSTRACT

Disclosed are an anti-ROR2 antibody and a use thereof. The anti-ROR2 antibody includes at least one of the following: (1) a light chain variable region with amino acid sequence shown in SEQ ID NO: 1, SEQ ID NO: 2 and SEQ ID NO: 3, and a heavy chain variable region with amino acid sequence shown in SEQ ID NO: 4, SEQ ID NO: 5 and SEQ ID NO: 6; compared with (1), the antibody or antigen-binding fragment has an amino acid sequence with at least one conservative amino acid substitution.

18 Claims, 16 Drawing Sheets

Specification includes a Sequence Listing.

SEQUENCE LISTING

```
<160> NUMBER OF SEQ ID NOS: 15

<210> SEQ ID NO 1
<211> LENGTH: 14
<212> TYPE: PRT
<213> ORGANISM: Artificial Sequence
<220> FEATURE:
<223> OTHER INFORMATION: Light chain complementarity-determining region
      1

<400> SEQUENCE: 1

Cys Ser Ala Ser Ser Ser Val Thr Tyr Thr Tyr Trp Tyr Gln
1               5                   10

<210> SEQ ID NO 2
<211> LENGTH: 9
<212> TYPE: PRT
<213> ORGANISM: Artificial Sequence
<220> FEATURE:
<223> OTHER INFORMATION: Light chain complementarity-determining region
      2

<400> SEQUENCE: 2

Ile Tyr Asp Thr Ser Asn Leu Ala Ser
1               5

<210> SEQ ID NO 3
<211> LENGTH: 14
<212> TYPE: PRT
<213> ORGANISM: Artificial Sequence
<220> FEATURE:
<223> OTHER INFORMATION: Light chain complementarity-determining region
      3

<400> SEQUENCE: 3

Cys Gln Gln Trp Ser Ser Tyr Pro Phe Thr Phe Gly Ser Gly
1               5                   10

<210> SEQ ID NO 4
<211> LENGTH: 11
<212> TYPE: PRT
<213> ORGANISM: Artificial Sequence
<220> FEATURE:
<223> OTHER INFORMATION: Heavy chain complementarity-determining region
      1

<400> SEQUENCE: 4

Tyr Thr Phe Thr Ser Tyr Leu Met His Trp Val
1               5                   10

<210> SEQ ID NO 5
<211> LENGTH: 25
<212> TYPE: PRT
<213> ORGANISM: Artificial Sequence
<220> FEATURE:
<223> OTHER INFORMATION: Heavy chain complementarity-determining region
      2

<400> SEQUENCE: 5
```

```
Leu Glu Trp Ile Gly Tyr Ile Asn Pro Tyr Asn Asp Gly Thr Lys
1               5                   10                  15

Tyr Asn Glu Lys Phe Lys Asp Lys Ala Thr
            20                  25
```

<210> SEQ ID NO 6
<211> LENGTH: 18
<212> TYPE: PRT
<213> ORGANISM: Artificial Sequence
<220> FEATURE:
<223> OTHER INFORMATION: Heavy chain complementarity-determining region 3

<400> SEQUENCE: 6

```
Cys Ala Arg Ser Asp Val Tyr Tyr Gly Val Arg Phe Ala Tyr Trp
1               5                   10                  15

Gly Gln Gly
```

<210> SEQ ID NO 7
<211> LENGTH: 106
<212> TYPE: PRT
<213> ORGANISM: Artificial Sequence
<220> FEATURE:
<223> OTHER INFORMATION: Light chain variable region

<400> SEQUENCE: 7

```
Asp Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Thr Tyr Thr
                20                  25                  30

Tyr Trp Tyr Gln Gln Lys Pro Gly Ser Ser Pro Arg Leu Leu Ile Tyr
            35                  40                  45

Asp Thr Ser Asn Leu Ala Ser Gly Val Pro Val Arg Phe Ser Gly Ser
        50                  55                  60

Gly Ser Gly Thr Ser Tyr Ser Leu Thr Ile Ser Arg Met Glu Ala Glu
65                  70                  75                  80

Asp Ala Ala Thr Tyr Tyr Cys Gln Gln Trp Ser Ser Tyr Pro Phe Thr
                85                  90                  95

Phe Gly Ser Gly Thr Lys Leu Glu Ile Lys
            100                 105
```

<210> SEQ ID NO 8
<211> LENGTH: 120
<212> TYPE: PRT
<213> ORGANISM: Artificial Sequence
<220> FEATURE:
<223> OTHER INFORMATION: Heavy chain variable region

<400> SEQUENCE: 8

```
Gln Leu Gln Leu Gln Gln Ser Gly Pro Glu Leu Val Lys Pro Gly Ala
1               5                   10                  15

Ser Val Arg Met Ser Cys Lys Ala Ala Gly Tyr Thr Phe Thr Ser Tyr
                20                  25                  30

Leu Met His Trp Val Lys Gln Arg Pro Gly Gln Asp Leu Glu Trp Ile
            35                  40                  45

Gly Tyr Ile Asn Pro Tyr Asn Asp Gly Thr Lys Tyr Asn Glu Lys Phe
        50                  55                  60

Lys Asp Lys Ala Thr Leu Thr Ser Asp Lys Ser Ser Ser Thr Val Tyr
65                  70                  75                  80
```

```
Met Glu Leu Ser Ser Leu Thr Ser Glu Asp Ser Ala Val Tyr Tyr Cys
                85                  90                  95

Ala Arg Ser Asp Val Tyr Tyr Gly Val Arg Phe Ala Tyr Trp Gly Gln
            100                 105                 110

Gly Thr Leu Val Thr Val Ser Ala
        115                 120
```

<210> SEQ ID NO 9
<211> LENGTH: 213
<212> TYPE: PRT
<213> ORGANISM: Artificial Sequence
<220> FEATURE:
<223> OTHER INFORMATION: Light chain

<400> SEQUENCE: 9

```
Asp Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Thr Tyr Thr
            20                  25                  30

Tyr Trp Tyr Gln Gln Lys Pro Gly Ser Ser Pro Arg Leu Leu Ile Tyr
        35                  40                  45

Asp Thr Ser Asn Leu Ala Ser Gly Val Pro Val Arg Phe Ser Gly Ser
    50                  55                  60

Gly Ser Gly Thr Ser Tyr Ser Leu Thr Ile Ser Arg Met Glu Ala Glu
65                  70                  75                  80

Asp Ala Ala Thr Tyr Tyr Cys Gln Gln Trp Ser Ser Tyr Pro Phe Thr
                85                  90                  95

Phe Gly Ser Gly Thr Lys Leu Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210
```

<210> SEQ ID NO 10
<211> LENGTH: 450
<212> TYPE: PRT
<213> ORGANISM: Artificial Sequence
<220> FEATURE:
<223> OTHER INFORMATION: Heavy chain

<400> SEQUENCE: 10

```
Gln Leu Gln Leu Gln Gln Ser Gly Pro Glu Leu Val Lys Pro Gly Ala
1               5                   10                  15

Ser Val Arg Met Ser Cys Lys Ala Ala Gly Tyr Thr Phe Thr Ser Tyr
            20                  25                  30

Leu Met His Trp Val Lys Gln Arg Pro Gly Gln Asp Leu Glu Trp Ile
        35                  40                  45
```

```
Gly Tyr Ile Asn Pro Tyr Asn Asp Gly Thr Lys Tyr Asn Glu Lys Phe
     50                  55                  60

Lys Asp Lys Ala Thr Leu Thr Ser Asp Lys Ser Ser Thr Val Tyr
 65                  70                  75                  80

Met Glu Leu Ser Ser Leu Thr Ser Glu Asp Ser Ala Val Tyr Tyr Cys
                 85                  90                  95

Ala Arg Ser Asp Val Tyr Tyr Gly Val Arg Phe Ala Tyr Trp Gly Gln
             100                 105                 110

Gly Thr Leu Val Thr Val Ser Ala Ala Ser Thr Lys Gly Pro Ser Val
             115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                 165                 170                 175

Leu Gln Ser Ser Gly Leu Tyr Ser Leu Ser Ser Val Val Thr Val Pro
             180                 185                 190

Ser Ser Ser Leu Gly Thr Gln Thr Tyr Ile Cys Asn Val Asn His Lys
             195                 200                 205

Pro Ser Asn Thr Lys Val Asp Lys Lys Val Glu Pro Lys Ser Cys Asp
210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                 245                 250                 255

Ser Arg Thr Pro Glu Val Thr Cys Val Val Val Asp Val Ser His Glu
             260                 265                 270

Asp Pro Glu Val Lys Phe Asn Trp Tyr Val Asp Gly Val Glu Val His
             275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                 325                 330                 335

Lys Thr Ile Ser Lys Ala Lys Gly Gln Pro Arg Glu Pro Gln Val Tyr
             340                 345                 350

Thr Leu Pro Pro Ser Arg Asp Glu Leu Thr Lys Asn Gln Val Ser Leu
             355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                 405                 410                 415

Lys Ser Arg Trp Gln Gln Gly Asn Val Phe Ser Cys Ser Val Met His
             420                 425                 430

Glu Ala Leu His Asn His Tyr Thr Gln Lys Ser Leu Ser Leu Ser Pro
             435                 440                 445

Gly Lys
   450
```

<210> SEQ ID NO 11
<211> LENGTH: 318
<212> TYPE: DNA
<213> ORGANISM: Artificial Sequence
<220> FEATURE:
<223> OTHER INFORMATION: Light chain variable region nucleotide sequence

<400> SEQUENCE: 11

```
gacatcgtgc tgacccagtc tccagccatc atgtctgcta gccctggcga gaaagtgaca      60
atgacctgct ccgcctcctc ctccgtgacc tacacctact ggtatcagca gaagcccggc     120
tccagtcctc ggctgctgat ctacgatacc tccaacctgg cttctggcgt gcccgtgcgg     180
ttttctggtt ctggctctgg cacctcctac agcctgacca tctccagaat ggaagccgag     240
gatgccgcca cctactactg tcagcagtgg tctagctacc ccttcacctt tggctccggc     300
accaagctgg aaatcaag                                                   318
```

<210> SEQ ID NO 12
<211> LENGTH: 360
<212> TYPE: DNA
<213> ORGANISM: Artificial Sequence
<220> FEATURE:
<223> OTHER INFORMATION: Heavy chain variable region nucleotide sequence

<400> SEQUENCE: 12

```
cagttgcagc tccagcagtc tggacctgag ctggttaagc ctggtgcctc cgtccggatg      60
tcttgcaagg ctgccggcta caccttcacc agctacctga tgcactgggt caagcagagg     120
ccaggccaga cttggagtg atcggctac atcaacccct acaacgacgg caccaagtac       180
aacgagaagt tcaaggacaa ggctaccctg acctccgaca gtcctcctc caccgtgtac      240 atggaactgt ccagcctgac ctctgaggac tccgccgtgt actactgcgc cagatccgat     300
gtgtactatg gcgtcagatt cgcctactgg ggccagggca cactggtcac agtttctgct    360
```

<210> SEQ ID NO 13
<211> LENGTH: 639
<212> TYPE: DNA
<213> ORGANISM: Artificial Sequence
<220> FEATURE:
<223> OTHER INFORMATION: Light chain nucleotide sequence

<400> SEQUENCE: 13

```
gacatcgtgc tgacccagtc tccagccatc atgtctgcta gccctggcga gaaagtgaca      60
atgacctgct ccgcctcctc ctccgtgacc tacacctact ggtatcagca gaagcccggc     120
tccagtcctc ggctgctgat ctacgatacc tccaacctgg cttctggcgt gcccgtgcgg     180
ttttctggtt ctggctctgg cacctcctac agcctgacca tctccagaat ggaagccgag     240
gatgccgcca cctactactg tcagcagtgg tctagctacc ccttcacctt tggctccggc     300
accaagctgg aaatcaagag aacagtggcc gctcctagcg tgttcatctt cccaccttcc     360
gacgagcagc tgaagtctgg cacagcctct gtcgtgtgcc tgctgaacaa cttctacccc     420
agagaagcca aggtgcagtg gaaggtggac aacgccctgc agagcggcaa tagccaagag     480
agcgtgaccg agcaggacag caaggactct acctacagcc tgagcagcac cctgacactg     540
agcaaggccg actacgagaa gcacaaagtg tacgcctgcg aagtgaccca ccagggcctt     600
tctagccctg tgaccaagag cttcaaccgg ggcgaatgt                            639
```

<210> SEQ ID NO 14
<211> LENGTH: 1350

```
<212> TYPE: DNA
<213> ORGANISM: Artificial Sequence
<220> FEATURE:
<223> OTHER INFORMATION: Heavy chain nucleotide sequence

<400> SEQUENCE: 14
cagttgcagc tccagcagtc tggacctgag ctggttaagc ctggtgcctc cgtccggatg      60
tcttgcaagg ctgccggcta caccttcacc agctacctga tgcactgggt caagcagagg     120
ccaggccagg acttggagtg gatcggctac atcaacccct acaacgacgg caccaagtac     180
aacgagaagt tcaaggacaa ggctaccctg acctccgaca gtcctcctc caccgtgtac      240
atggaactgt ccagcctgac ctctgaggac tccgccgtgt actactgcgc cagatccgat     300
gtgtactatg gcgtcagatt cgcctactgg ggccagggca cactggtcac agtttctgct     360
gcctctacaa agggccctag tgtgttccct ctggctccca gcagcaagtc tacatctggc     420
ggaacagccg ctctgggctg cctggtcaag gattactttc ccgagcctgt gaccgtgtcc     480
tggaatagcg gagcactgac aagcggcgtg cacacctttc agctgtgtct gcaaagcagc     540
ggcctgtact ctctgagcag cgtggtcaca gtgcctagct ctagcctggg cacccagacc     600
tacatctgca atgtgaacca caagcctagc aacaccaagg tggacaagaa ggtggaaccc     660
aagagctgcg acaagaccca cacctgtcct ccatgtcctg ctccagaact gctcggcgga     720
ccttccgtgt tcctgttcc tccaaagcct aaggacaccc tgatgatcag cagaacccct    780
gaagtgacct gcgtggtggt ggatgtgtcc cacgaggatc ccgaagtgaa gttcaattgg     840
tacgtggacg gcgtggaagt gcacaacgcc aagaccaagc ctagagagga acagtacaac     900
agcacctaca gagtggtgtc cgtgctgacc gtgctgcacc aggattggct gaacggcaaa     960
gagtacaagt gcaaggtgtc caacaaggcc ctgcctgctc tatcgagaa aaccatcagc    1020
aaggccaagg gccagcctag ggaacccag gtttacacac tgcctccaag cagggacgag    1080
ctgaccaaga atcaggtgtc cctgacctgc ctcgtgaagg gcttctaccc ttccgatatc    1140
gccgtggaat gggagagcaa tggccagcct gagaacaact acaagacaac ccctcctgtg    1200
ctggacagcg acggctcatt cttcctgtac agcaagctga cagtggacaa gtccagatgg    1260
cagcagggca acgtgttcag ctgcagcgtg atgcacgagg ccctgcacaa ccactacacc    1320
cagaagtccc tgagcctgtc tcctggcaaa                                    1350

<210> SEQ ID NO 15
<211> LENGTH: 8
<212> TYPE: PRT
<213> ORGANISM: Artificial Sequence
<220> FEATURE:
<223> OTHER INFORMATION: the FLAG tag

<400> SEQUENCE: 15

Asp Tyr Lys Asp Asp Asp Asp Lys
                5
```

ANTIBODIES FOR TREATING MALIGNANT TUMORS AND USES THEREOF

CROSS-REFERENCE TO RELATED APPLICATIONS

This application is a Continuation Application of International Application No. PCT/CN2019/130493, filed on Dec. 31, 2019, which claims priority to Chinese Application No. 201910015048.2, filed on Jan. 8, 2019, the entire disclosure of which is incorporated herein by reference.

This application contains a sequence listing submitted as an ASCII text file, named "Seq-List.txt" and created on Jul. 2, 2024, with 13,960 bytes in size. The material in the above-identified ASCII text file is incorporated herein by reference in its entirety.

TECHNICAL FIELD

The present disclosure relates to the field of biomedicine, in particular to antibodies for treating malignant tumors and uses thereof, and in particular to an anti-ROR2 antibody and a use thereof.

BACKGROUND

The tyrosine kinase orphan-like receptor ROR2 is an important development-related regulatory protein, and ROR2 is highly expressed in various tissues during early embryonic development and plays an important role in tissue growth and differentiation. After the second trimester, the expression level of ROR2 gradually decreases. Except for expression in some osteoblasts and uterine cells, ROR2 is basically not expressed in adult tissues. The current research shows that ROR2 is highly expressed in many tumor tissues, including osteosarcoma, melanoma, colorectal cancer and gastric cancer, breast cancer, lymphoma, leukemia and other cancers. Therefore, many scholars believe that ROR2 is a disease-related gene and can be used as an ideal drug target.

ROR2 is a tyrosine kinase orphan receptor that is expressed in large quantities and plays an important role during embryonic development, and ROR2 is difficult to be detected in most adult tissues. Studies in recent years have found that although most normal tissues do not express ROR2, many malignant tumor cells including breast cancer, lung cancer, pancreatic cancer and other cells have high expression of ROR2. In addition, cancer cells with higher ROR2 expression levels are more malignant and prone to metastasis, recurrence, and poorer prognosis. ROR2 can usually be detected on tumor cells with a low degree of differentiation, which have strong recurrence and metastasis ability.

However, drug development for ROR2 needs to be improved.

SUMMARY

The present disclosure aims to solve one of the technical problems in the related art to a certain extent. To this end, one purpose of the present disclosure is to provide an anti-ROR2 antibody and a use thereof.

The present disclosure is based on the inventor's following research findings: during the process of tumor research, a surface marker of tumor stem cells, such as CD133, CD44, CD24, ALDH1, or the like, is expressed in tumor cells and normal adult tissues. As a result, the anti-tumor stem cell drugs developed for these surface molecules will also cause certain toxicity to normal tissues. However, ROR2 is also abundantly expressed in tumor stem cells, but less expressed in normal cells. Therefore, the development of therapeutic antibodies against ROR2 will cause less damage to normal tissues. Thus, ROR2 is an ideal drug target. The drugs developed for ROR2 can be used in the treatment of tumors and cancer, and the damage to normal tissues will be relatively small.

To this end, the present disclosure provides an anti-ROR2 antibody or antigen-binding fragment, and an isolated nucleotide, an expression vector, and a recombinant cell. The anti-ROR2 antibody or antigen-binding fragment provided in the present disclosure can bind to the ROR2 antigen with high specificity, and can exhibit higher affinity at a lower concentration, for example, at a concentration of 0.0001 µg/ml. It is of great value to apply it to the targeted therapy of tumors, or to make a kit for the specific detection of ROR2 antigen.

According to a first aspect of the present disclosure, the present disclosure provides an anti-ROR2 antibody or antigen-binding fragment, including at least one of the following: (1) a light chain variable region with amino acid sequence shown in SEQ ID NO: 1, SEQ ID NO: 2 and SEQ ID NO: 3, and a heavy chain variable region with amino acid sequence shown in SEQ ID NO: 4, SEQ ID NO: 5 and SEQ ID NO: 6; compared with (1), the antibody or antigen-binding fragment has an amino acid sequence with at least one conservative amino acid substitution. The antibody or antigen-binding fragment provided in the present disclosure can specifically bind to the ROR2 protein.

According to an embodiment of the present disclosure, the above-mentioned antibody or antigen-binding fragment further includes the following technical features.

In some embodiments of the present disclosure, the antibody or antigen-binding fragment includes at least one of the following:
(a) a light chain variable region with amino acid sequence shown in SEQ ID NO: 7 and a heavy chain variable region with amino acid sequence shown in SEQ ID NO: 8; compared with (a), the antibody or antigen-binding fragment has an amino acid sequence with at least one conservative amino acid substitution.

In some embodiments of the present disclosure, the antibody or antigen-binding fragment includes a light chain shown in SEQ ID NO: 9 and a heavy chain shown in SEQ ID NO: 10.

In some embodiments of the present disclosure, the epitope of the antibody or antigen-binding fragment is the Kringle fragment of the extracellular end of ROR2.

According to a second aspect of the present disclosure, the present disclosure provides an isolated polynucleotide encoding the antibody or antigen-binding fragment described in the first aspect of the present disclosure.

According to an embodiment of the present disclosure, the polynucleotide includes at least one of the following nucleotide sequences: a light chain variable region nucleotide sequence shown in SEQ ID NO: 11 and a heavy chain variable region nucleotide sequence shown in SEQ ID NO: 12; a light chain nucleotide sequence shown in SEQ ID NO: 13 and a heavy chain nucleotide sequence shown in SEQ ID NO: 14;

compared with the light chain variable region nucleotide sequence shown in SEQ ID NO: 11, the polynucleotide has a sequence of more than 90% homology, optionally a sequence of more than 95% homology, preferably a sequence of more than 98% homology, more preferably a sequence of more than 99% homology;

compared with the heavy chain variable region nucleotide sequence shown in SEQ ID NO: 12, the polynucleotide has a sequence of more than 90% homology, optionally a sequence of more than 95% homology, preferably a sequence of more than 98% homology, more preferably a sequence of more than 99% homology;

compared with the light chain nucleotide sequence shown in SEQ ID NO: 13, the polynucleotide has a sequence of more than 90% homology, optionally a sequence of more than 95% homology, preferably a sequence of more than 98% homology, more preferably a sequence of more than 99% homology;

compared with the heavy chain nucleotide sequence shown in SEQ ID NO: 14, the polynucleotide has a sequence of more than 90% homology, optionally a sequence of more than 95% homology, preferably a sequence of more than 98% homology, more preferably a sequence of more than 99% homology.

According to a third aspect of the present disclosure, the present disclosure provides an expression vector including the polynucleotide described in the second aspect of the present disclosure.

In some embodiments of the present disclosure, the expression vector further includes: a control element operably linked to the polynucleotide for controlling the expression of the polynucleotide in the host cell.

In some embodiments of the present disclosure, the control element includes at least one of the following: a promoter, an enhancer, and a terminator.

In some embodiments of the present disclosure, the host cell is a mammalian cell.

According to a fourth aspect of the present disclosure, the present disclosure provides a recombinant cell including the expression vector described in any one of the embodiments of the third aspect of the present disclosure.

According to a fifth aspect of the present disclosure, the present disclosure provides a method for preparing an anti-ROR2 antibody or antigen-binding fragment, including culturing the recombinant cell described in the fourth aspect of the present disclosure. The antibody or antigen-binding fragment is the antibody or antigen-binding fragment described in the first aspect of the present disclosure.

According to a sixth aspect of the present disclosure, the present disclosure provides a use of an antibody or antigen-binding fragment in the preparation of a medicine. The medicine is used to treat cancer, and the antibody or antigen-binding fragment is the antibody or antigen-binding fragment described in the first aspect of the present disclosure.

According to a seventh aspect of the present disclosure, the present disclosure provides a use of an antibody or antigen-binding fragment in the preparation of a kit. The kit is used for the diagnosis and detection of ROR2 antigen.

In some embodiments of the present disclosure, the kit is used for immunoblotting, immunoprecipitation, and ELISA detection.

According to an eighth aspect of the present disclosure, the present disclosure provides a pharmaceutical composition, including: the antibody or antigen-binding fragment described in any one of the embodiments of the first aspect of the present disclosure and a pharmaceutically acceptable carrier.

According to a ninth aspect of the present disclosure, the present disclosure provides an anti-ROR2 chimeric antigen receptor, including: an extracellular domain, a transmembrane domain and an intracellular domain. The extracellular domain includes an antibody or antigen-binding fragment, the antibody or antigen-binding fragment is a single chain, and the antibody or antigen-binding fragment is the antibody or antigen-binding fragment according to any one of the embodiments of the first aspect of the present disclosure.

According to a tenth aspect of the present disclosure, the present disclosure provides a CAR-T cell that expresses the anti-ROR2 chimeric antigen receptor described in the ninth aspect of the present disclosure. The antibody or antigen-binding fragment provided in the present disclosure is used as a single-chain antibody and an intracellular signal domain protein, such as an immunoreceptor tyrosine activation motif protein (usually CD32), to perform gene recombination in vitro to generate a recombinant plasmid. The recombinant plasmid is transfected into patient's T cells through transfection technology in vitro, such that the patient's T cells express tumor antigen receptors. After transfection, the purified and large-scale expanded T cells are called chimeric antigen receptor T cells (CAR-T cells). The CAR-expressing T cells bind to tumor antigens in an antigen-dependent, non-MHC-restricted manner, and initiate and activate specific tumor-killing responses.

DETAILED DESCRIPTION OF THE EMBODIMENTS

Figure 1:
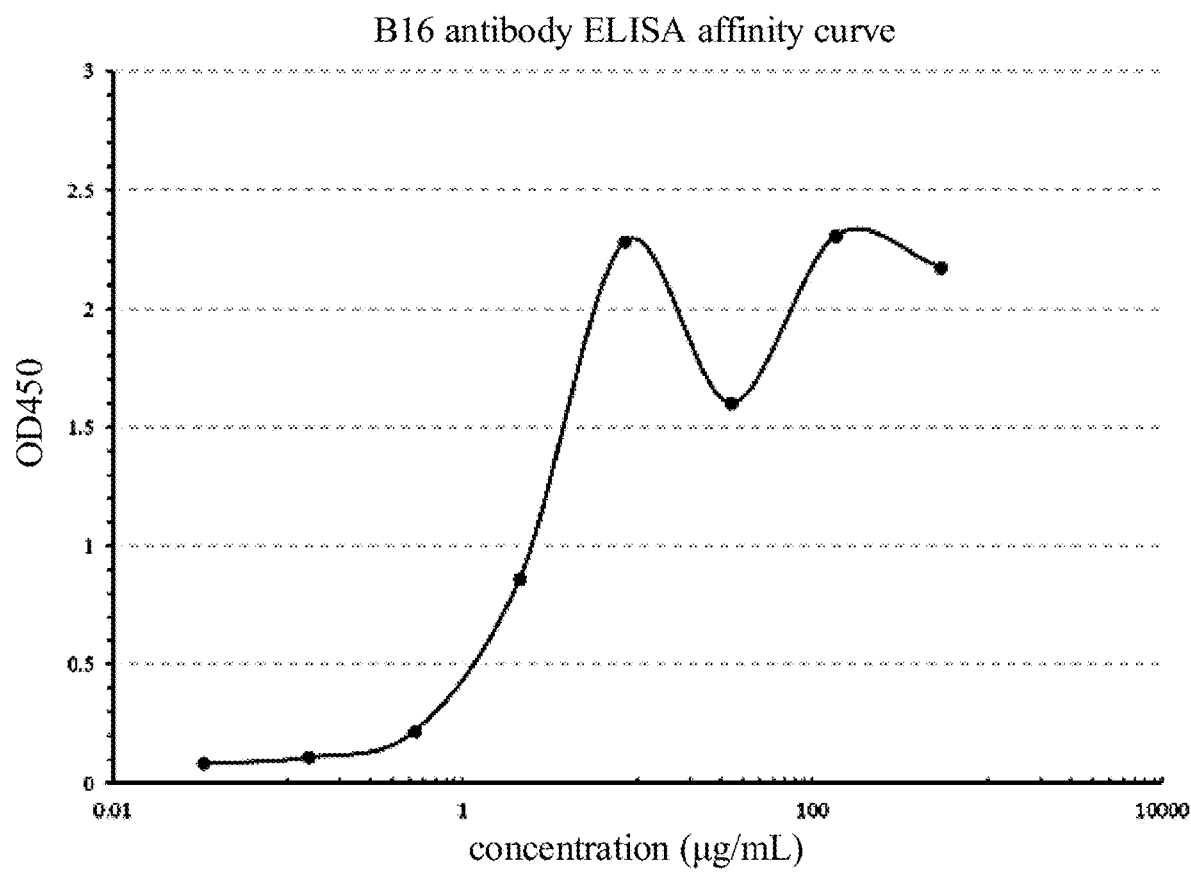
FIG. 1 is an ELASA affinity curve of B16 Fab antibody according to an embodiment of the present disclosure.

The embodiments of the present disclosure are described in detail below, and examples of the embodiments are shown in the accompanying drawings. The same or similar reference numerals indicate the same or similar elements or elements with the same or similar functions. The embodiments described below with reference to the drawings are exemplary, and are intended to explain the present disclosure, but should not be understood as a limitation to the present disclosure.

During the process of describing the present disclosure, the relevant terms herein have been explained and described. These explanations and descriptions are only for the convenience of understanding the solution, and should not be regarded as a limitation to the protection solution of the present disclosure.

Antibody

As used herein, the term "antibody" is an immunoglobulin molecule capable of binding to a specific antigen, including two light chains with a lighter molecular weight and two heavy chains with a heavier molecular weight. The heavy chain (H chain) and the light chain (L chain) are linked by disulfide bonds to form a tetrapeptide chain molecule. The amino acid sequence of the amino terminal (N-terminal) of the peptide chain varies greatly, which is called the variable region (V region), and the carboxyl terminal (C-terminal) is relatively stable with little change, called the constant region (C region). The V regions of the L chain and H chain are called VL and VH, respectively.

In the variable region, the amino acid composition and sequence of certain regions have a higher degree of change, which is called the hypervariable region (HVR). The hypervariable region is where the antigen and the antibody bind, so it is also called the complementarity-determining region (CDR). There are three CDR regions on both the heavy chain variable region and the light chain variable region.

The present disclosure uses the extracellular segment of ROR2 to obtain anti-ROR2 Fab antibody fragments with high specificity and high affinity through immunization. The antibody fragment can specifically bind to the ROR2 antigen, which can target the treatment of tumors and other diseases.

In some embodiments, the present disclosure provides an anti-ROR2 antibody or antigen-binding fragment, including a light chain variable region shown in SEQ ID NO: 1, SEQ ID NO: 2 and SEQ ID NO: 3, and a heavy chain variable region shown in SEQ ID NO: 4, SEQ ID NO: 5 and SEQ ID NO: 6. In some other embodiments, compared with the light chain and the heavy chain described above, the antibody or antigen-binding fragment provided in the present disclosure has more than one conservative amino acid substitution. "Antigen-binding fragment" refers to an antibody fragment that retains the ability to specifically bind to an antigen (ROR2). "Conservative amino acid substitution" refers to the substitution of an amino acid with a residue that is biologically, chemically or structurally similar to another amino acid. Biologically similar means that the substitution does not destroy the biological activity of the ROR2 antibody or the ROR2 antigen. Structurally similar means that amino acids have side chains of similar length, such as alanine, glycine, or serine, or side chains of similar size. Chemically similar means that the amino acids have the same charge or are both hydrophilic or hydrophobic. For example, the hydrophobic residues isoleucine, valine, leucine or methionine are substituted for each other, alternatively, polar amino acids such as arginine for lysine, glutamic acid for aspartic acid, glutamine for asparagine, serine for threonine, and so on.

The amino acid sequence shown in SEQ ID NO: 1 is: CSASSSVTYTYWYQ.

The amino acid sequence shown in SEQ ID NO: 2 is: IYDTSNLAS.

The amino acid sequence shown in SEQ ID NO: 3 is: CQQWSSYPFTFGSG.

The amino acid sequence shown in SEQ ID NO: 4 is: YTFTSYLMHWV.

The amino acid sequence shown in SEQ ID NO: 5 is: LEWIGYINPYNDGTKYNEKFKDKAT.

The amino acid sequence shown in SEQ ID NO: 6 is: CARSDVYYGVRFAYWGQG.

In some embodiments, the present disclosure provides an antibody or antigen-binding fragment including a light chain variable region sequence shown in SEQ ID NO: 7 and a heavy chain variable region sequence shown in SEQ ID NO: 8. In some other embodiments, compared with the amino acid sequence shown in SEQ ID NO: 7, the light chain variable region sequence of the antibody or antigen-binding fragment has more than one conservative amino acid substitution. In some embodiments, compared with the amino acid sequence shown in SEQ ID NO: 8, the heavy chain variable region sequence of the antibody or antigen-binding fragment has more than one conservative amino acid substitution. These conservative amino acid substitutions will not change the biological function of the antibody or antigen-binding fragment. In some specific ways, these conservative amino acid substitutions can occur on amino acids other than the CDR regions in the heavy chain variable region and the light chain variable region.

```
The light chain variable region
sequence (VL, SEQ ID NO: 1) is:
DIVLTQSPAIMSASPGEKVTMTCSASSSVTYTYWYQQKPG

SSPRLLIYDTSNLASGVPVRFSGSGSGTSYSLTISRMEAE

DAATYYCQQWSSYPFTFGSGTKLEIK.

The heavy chain variable region
sequence (VH, SEQ ID NO: 2) is:
QLQLQQSGPELVKPGASVRMSCKAAGYTFTSYLMHWVKQR

PGQDLEWIGYINPYNDGTKYNEKFKDKATLTSDKSSSTVY

MELSSLTSEDSAVYYCARSDVYYGVRFAYWGQGTLVTVSA.
```

In some embodiments, the present disclosure provides an anti-ROR2 antibody, including a light chain shown in SEQ ID NO: 9 and a heavy chain shown in SEQ ID NO: 10.

```
The amino acid sequence shown in
SEQ ID NO: 3 is:
DIVLTQSPAIMSASPGEKVTMTCSASSSVTYTYWYQQKPG

SSPRLLIYDTSNLASGVPVRFSGSGSGTSYSLTISRMEAE

DAATYYCQQWSSYPFTFGSGTKLEIKRTVAAPSVFIFPPS

DEQLKSGTASVVCLLNNFYPREAKVQWKVDNALQSGNSQE

SVTEQDSKDSTYSLSSTLTLSKADYEKHKVYACEVTHQGL

SSPVTKSFNRGEC.

The amino acid sequence shown in
SEQ ID NO: 4 is:
QLQLQQSGPELVKPGASVRMSCKAAGYTFTSYLMHWVKQR

PGQDLEWIGYINPYNDGTKYNEKFKDKATLTSDKSSSTVY

MELSSLTSEDSAVYYCARSDVYYGVRFAYWGQGTLVTVSA

ASTKGPSVFPLAPSSKSTSGGTAALGCLVKDYFPEPVTVS

WNSGALTSGVHTFPAVLQSSGLYSLSSVVTVPSSSLGTQT

YICNVNHKPSNTKVDKKVEPKSCDKTHTCPPCPAPELLGG

PSVFLEPPKPKDTLMISRTPEVTCVVVDVSHEDPEVKFNW

YVDGVEVHNAKTKPREEQYNSTYRVVSVLTVLHQDWLNGK

EYKCKVSNKALPAPIEKTISKAKGQPREPQVYTLPPSRDE

LTKNQVSLTCLVKGFYPSDIAVEWESNGQPENNYKTTPPV

LDSDGSFFLYSKLTVDKSRWQQGNVFSCSVMHEALHNHYT

QKSLSLSPGK.
```

Polynucleotide, Expression Vector, Recombinant Cell

During the process of preparing or obtaining these antibodies, polynucleotides expressing these antibodies can be linked to different vectors and then expressed in different cells to obtain corresponding antibodies.

To this end, the present disclosure also provides an isolated polynucleotide encoding the antibody or antigen-binding fragment described above.

In some embodiments, the isolated polynucleotide includes a nucleotide sequence encoding the amino acid sequence shown in SEQ ID NO: 7 of the light chain variable region and a nucleotide sequence encoding the amino acid sequence shown in SEQ ID NO: 8 of the heavy chain variable region.

```
The nucleotide sequence encoding the amino
acid sequence shown in SEQ ID NO: 1
of the light chain variable region
is (SEQ ID NO: 5):
gacatcgtgctgacccagtctccagccatcatgtctgcta gccctggcgagaaagtgacaatgacctgctccgcctcctc ctccgtgacctacacctactggtatcagcagaagcccggc tccagtcctcggctgctgatctacgatacctccaacctgg cttctggcgtgcccgtgcggttttctggttctggctctgg cacctcctacagcctgaccatctccagaatggaagccgag gatgccgccacctactactgtcagcagtggtctagctacc ccttcacctttggctccggcaccaagctggaaatcaag.

The nucleotide sequence encoding the amino
acid sequence shown in SEQ ID NO: 2 of the
heavy chain variable region is
(SEQ ID NO: 6)
cagttgcagctccagcagtctggacctgagctggttaagc ctggtgcctccgtccggatgtcttgcaaggctgccggcta caccttcaccagctacctgatgcactgggtcaagcagagg ccaggccaggacttggagtggatcggctacatcaaccct acaacgacggcaccaagtacaacgagaagttcaaggacaa ggctaccctgacctccgacaagtcctcctccaccgtgtac atggaactgtccagcctgacctctgaggactccgccgtgt actactgcgccagatccgatgtgtactatggcgtcagatt cgcctactggggccagggcacactggtcacagtttctgct.
```

In some embodiments, the isolated polynucleotide has at least 90% or more homology with the nucleotide sequence shown in SEQ ID NO: 11, preferably more than 95% homology, and more preferably 98%, 99% or more homology. In some embodiments, the isolated polynucleotide has at least 90% or more homology with the nucleotide sequence shown in SEQ ID NO: 12, preferably more than 95% homology, and more preferably 98%, 99% or more homology. These sequences that have homology with the nucleotide sequence shown in SEQ ID NO: 11 or SEQ ID NO: 12 can express amino acids similar to SEQ ID NO: 7 and SEQ ID NO: 8, such that they can specifically bind to the ROR2 antigen and realize the targeting function of the antibody.

In some embodiments, the isolated polynucleotide includes a light chain nucleotide sequence shown in SEQ ID NO: 13 and a heavy chain nucleotide sequence shown in SEQ ID NO: 14. These nucleotide sequences are optimized for species and are more easily expressed in mammalian cells.

```
The light chain nucleotide sequence
is (SEQ ID NO: 7):
gacatcgtgctgacccagtctccagccatcatgtctgcta
```

-continued
gccctggcgagaaagtgacaatgacctgctccgcctcctc ctccgtgacctacacctactggtatcagcagaagccggc tccagtcctcggctgctgatctacgatacctccaacctgg cttctggcgtgcccgtgcggttttctggttctggctctgg cacctcctacagcctgaccatctccagaatggaagccgag gatgccgccacctactactgtcagcagtggtctagctacc ccttcacctttggctccggcaccaagctggaaatcaagag aacagtggccgctcctagcgtgttcatcttcccaccttcc gacgagcagctgaagtctggcacagcctctgtcgtgtgcc tgctgaacaacttctaccccagagaagccaaggtgcagtg gaaggtggacaacgccctgcagagcggcaatagccaagag agcgtgaccgagcaggacagcaaggactctacctacagcc tgagcagcaccctgacactgagcaaggccgactacgagaa gcacaaagtgtacgcctgcgaagtgacccaccagggcctt tctagccctgtgaccaagagcttcaaccggggcgaatgt.

The heavy chain nucleotide sequence
is (SEQ ID NO: 8):
cagttgcagctccagcagtctggacctgagctggttaagc ctggtgcctccgtccggatgtcttgcaaggctgccggcta caccttcaccagctacctgatgcactgggtcaagcagagg ccaggccaggacttggagtggatcggctacatcaacccct acaacgacggcaccaagtacaacgagaagttcaaggacaa ggctaccctgacctccgacaagtcctcctccaccgtgtac atggaactgtccagcctgacctctgaggactccgccgtgt actactgcgccagatccgatgtgtactatggcgtcagatt cgcctactgggccagggcacactggtcacagtttctgct gcctctacaaagggccctagtgtgttccctctggctccca gcagcaagtctacatctggcggaacagccgctctgggctg cctggtcaaggattactttcccgagcctgtgaccgtgtcc tggaatagcggagcactgacaagcggcgtgcacacctttc cagctgtgctgcaaagcagcggcctgtactctctgagcag cgtggtcacagtgcctagctctagcctgggcacccagacc tacatctgcaatgtgaaccacaagcctagcaacaccaagg tggacaagaaggtggaacccaagagctgcgacaagaccca cacctgtcctccatgtcctgctccagaactgctcggcgga ccttccgtgttcctgtttcctccaaagcctaaggacaccc tgatgatcagcagaaccctgaagtgacctgcgtggtggt ggatgtgtcccacgaggatcccgaagtgaagttcaattgg tacgtggacggcgtggaagtgcacaacgccaagaccaagc ctagagaggaacagtacaacagcacctacagagtggtgtc cgtgctgaccgtgctgcaccaggattggctgaacggcaaa gagtacaagtgcaaggtgtccaacaaggccctgcctgctc ctatcgagaaaaccatcagcaaggccaagggccagcctag ggaaccccaggtttacacactgcctccaagcagggacgag ctgaccaagaatcaggtgtccctgacctgcctcgtgaagg gcttctaccttccgatatcgccgtggaatgggagagcaa tggccagcctgagaacaactacaagacaacccctcctgtg ctggacagcgacggctcattcttcctgtacagcaagctga cagtggacaagtccagatggcagcagggcaacgtgttcag ctgcagcgtgatgcacgaggccctgcacaaccactacacc cagaagtccctgagcctgtctcctggcaaa.

The present disclosure also provides an expression vector, including the isolated polynucleotide described above. When the isolated polynucleotide is linked to the vector, the polynucleotide can be directly or indirectly linked to the control elements on the vector, as long as these control elements can control the translation and expression of the polynucleotide. These control elements can come directly from the vector itself, or can be exogenous, that is, they do not come from the vector itself. These control elements may be promoters, enhancers, terminators, etc., as long as they can regulate gene expression. The polynucleotide only needs to be operably linked to the control elements. "Operably linked" herein refers to linking an exogenous gene to a vector, such that the control elements in the vector, such as transcription control sequences and translation control sequences, etc., can perform their expected functions of regulating the transcription and translation of foreign genes. The polynucleotides encoding the heavy chain and light chain of the antibody can be inserted into different vectors independently, and it is common to insert into the same vector. Commonly used vectors can be, for example, plasmids, bacteriophages, etc., such as pcDNA plasmids.

The present disclosure also provides a recombinant cell including the expression vector. The expression vector can be introduced into mammalian cells to construct the recombinant cells, and then uses these recombinant cells to express the antibody or antigen-binding fragment provided in the present disclosure. By culturing the recombinant cells, the corresponding antibodies can be obtained. These usable mammalian cells can be, for example, 293F cells, CHO cells, and the like.

Pharmaceutical composition, kit, pharmaceutical use and use in the preparation of kit The present disclosure also provides a pharmaceutical composition including the antibody or antigen-binding fragment described above and a pharmaceutically acceptable carrier.

The anti-ROR2 antibody provided herein can be incorporated into the pharmaceutical composition suitable for administration to a subject. Generally, the pharmaceutical composition includes the anti-ROR2 antibody provided herein and a pharmaceutically acceptable carrier. The "pharmaceutically acceptable carrier" can include any and all solvents, dispersion media, coatings, antibacterial and antifungal agents, isotonic and absorption delaying agents, and the like that are physiologically compatible. Specific examples may be one or more of water, saline, phosphate buffered saline, glucose, glycerol, ethanol, etc., and combinations thereof. In many cases, isotonic agents are included in the pharmaceutical composition, such as sugars, polyols (such as mannitol, sorbitol), or sodium chloride. The pharmaceutically acceptable carrier can also include minor amounts of auxiliary substances, such as wetting or emulsifying agents, preservatives or buffers, to extend the shelf life or efficacy of the antibody.

For example, the antibody of the present disclosure can be incorporated into the pharmaceutical composition suitable for parenteral administration (e.g., intravenous, subcutaneous, intraperitoneal, intramuscular). The pharmaceutical composition can be prepared into various forms, such as liquid, semi-solid and solid dosage forms, or the like, including but not limited to liquid solution (for example, injection solution and infusion solution), dispersion or suspension, tablet, pill, powder, liposome, and suppository. Typical pharmaceutical composition is in the form of injection solution or infusion solution. The antibody can be administered by intravenous infusion or injection, or intramuscular or subcutaneous injection.

The anti-ROR2 antibody herein can also be made into a part of a kit or other diagnostic reagents as needed. According to an embodiment of the present disclosure, the present disclosure also provides a kit including the ROR2 antibody described above. The kit provided in the present disclosure, for example, can be used for immunoblotting, immunoprecipitation, etc., involving the use of ROR2 antigen and antibody specific binding properties. The kit can include any one or more of the following: antagonist, anti-ROR2 antibody or drug reference material; protein purification column; immunoglobulin affinity purification buffer; cell assay diluent; instruction or literature, or the like. The anti-ROR2 antibody can be used in different types of diagnostic tests, for example, can detect the presence of various diseases or drugs, toxins or other proteins in vitro or in vivo. For example, the subject's serum or blood can be tested to test related diseases. Such related diseases can include ROR2 related diseases, such as various cancers and so on. The antibody provided herein can also be used for radioimmunoassay and radioimmunotherapy of cancer.

These cancers or tumors can be any unregulated cell growth, specifically, lung cancer, gastric cancer, pancreatic cancer, ovarian cancer, liver cancer, breast cancer, colorectal cancer, lymphoma, blood cancer, and so on.

When using the anti-ROR2 antibody provided in the present disclosure to treat cancer, the anti-ROR2 antibody provided in the present disclosure can be provided to the subject. To this end, the present disclosure provides a method for treating cancer, including administering the antibody or antigen-binding fragment provided in the present disclosure to a subject in need.

The solution of the present disclosure will be explained below in conjunction with embodiments. Those skilled in the art will understand that the following embodiments are only used to illustrate the present disclosure, and should not be regarded as limiting the scope of the present disclosure. Where specific techniques or conditions are not indicated in the examples, the procedures shall be carried out in accordance with the techniques or conditions described in the literature in the field or in accordance with the product specification. The reagents or instruments used without the manufacturer's indication are all conventional products that can be purchased commercially.

Through research, the present disclosure has developed ROR2-based antibody-based immunotherapy methods against multiple tumor cells (even tumor stem cells), including ROR2 monoclonal antibody, and a novel ROR2-Car T cell therapy technology.

Embodiment 1

ROR2 protein, immunized mice and phage library technology were used to screen and obtain B16 antibody. The ELISA detection of this antibody is shown in FIG. 1. The abscissa represents the Fab antibody concentration of B16, which are 0.033, 0.134, 0.535, 2.138, 8.552, 34.210, 136.838, 547.352 μg/ml, respectively, and the ordinate represents the measured OD450 value. It can be seen from FIG. 1 that when the Fab antibody concentration of B16 is 8.552 μg/ml, the ELISA detection shows that the affinity of the antibody is basically saturated, indicating that the antibody has a higher affinity.

The amino acid sequencing was performed on the antibody sample. The amino acid sequence is as follows:

The light chain variable region sequence of the antibody is shown in SEQ ID NO: 7; the heavy chain variable region sequence of the antibody is shown in SEQ ID NO: 8. The corresponding light chain amino acid sequence is shown in SEQ ID NO: 9, and the heavy chain amino acid sequence is shown in SEQ ID NO: 10.

Embodiment 2

Figure 2:
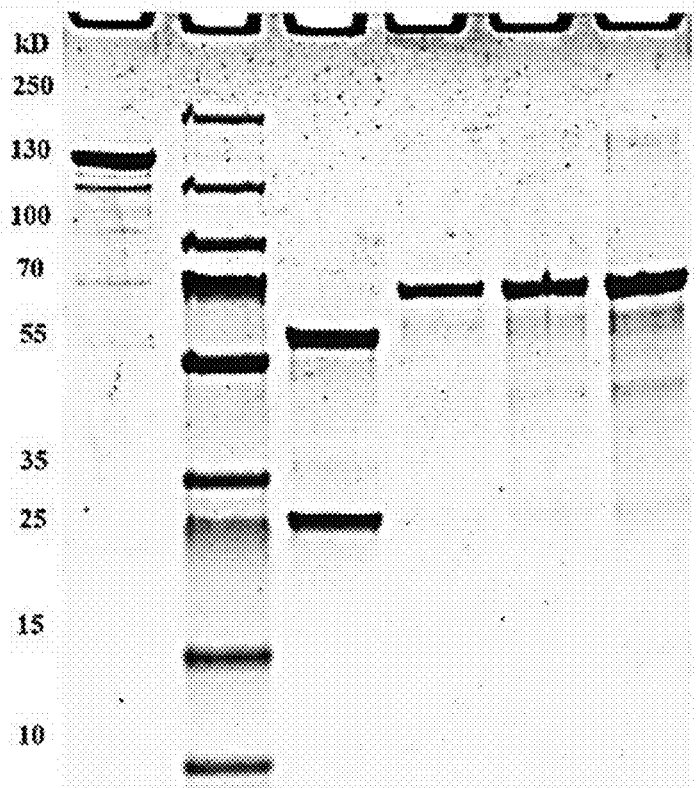
FIG. 2 is an SDS-PAGE identification result diagram after purification of B16 chimeric antibody according to an embodiment of the present disclosure.

(1) Expression and Purification of Anti-ROR2 Monoclonal Antibody B16 Chimeric Antibody The DNA sequence was deduced by using the amino acid sequence of the B16 antibody, and the expression sequence of the chimeric antibody was established after species optimization according to the expression vector, and cloned into the pcDNA3.4 vector. Then the constructed plasmid was transfected into 293F cells with PEI and expressed for 48 hours. After 48 hours, the supernatant was recovered, and purified and chromatographed/concentrated on a Protein A column. The purified protein was identified by SDS-PAGE gel. The results are shown in FIG. 2, showing that the purified antibody has high purity. The species optimization does not change the amino acid sequence, only the nucleotide sequence is changed, and the codon optimization is carried out according to the expression host, making it easier to express in mammalian cells.

It should be noted that the obtained B16 chimeric antibody has the same amino acid sequence as the B16 antibody described in Embodiment 1. The light chain amino acid sequence is shown in SEQ ID NO: 9, and the heavy chain amino acid sequence is shown in SEQ ID NO: 10. Only the nucleotide sequence expressing the B16 antibody is optimized, that is, the corresponding nucleotide sequence of the B16 chimeric antibody is shown in SEQ ID NO: 13, and the corresponding nucleotide sequence is shown in SEQ ID NO: 14.

In FIG. 2, from left to right, the first column represents the SDS-PAGE gel identification result of non-reduced B16 antibody sample with a loading amount of 2.0 μg. The second column represents protein marker. The third column represents the SDS-PAGE gel identification result of reduced B16 antibody sample with a loading amount of 2.0 μg. The fourth, fifth, and sixth columns represent the SDS-PAGE gel results of reduced fetal bovine serum albumin (BSA) samples with loading amounts of 0.5 μg, 1.0 μg, and 2 μg, respectively.

It can be seen from FIG. 2 that the reduced and non-reduced B16 antibody in the SDS-PAGE gel is the same as the normal antibody band size. The gray value of the band is close to 2 μg of reduced fetal bovine serum albumin (BSA) sample, which shows that the purified B16 chimeric antibody has high purity.

(2) ELASA Verifies the Affinity of the Purified ROR2 Antibody (B16 Chimeric Antibody)

Figure 3:
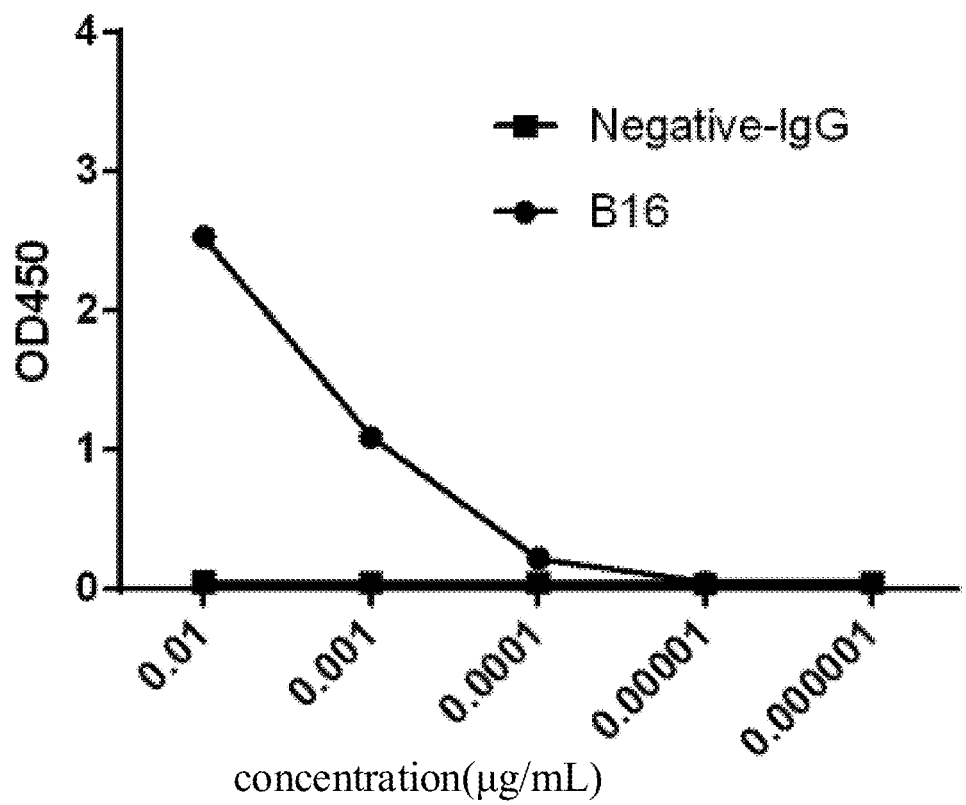
FIG. 3 shows OD450 values of B16 chimeric antibodies at different concentrations according to an embodiment of the present disclosure.

The 96-well plate was coated with ROR2 extracellular protein overnight. After blocking with 5% milk, the purified antibody was diluted to different concentrations and added to different wells for ELASA detection. OD450 is shown in FIG. 3. FIG. 3 shows the OD450 values of different concentrations of B16 chimeric antibody. The abscissa represents the concentration of B16 chimeric antibody, which are 0.01 µg/ml, 0.001 µg/ml, 0.0001 µg/ml, 0.00001 µg/ml and 0.000001 µg/ml, respectively. It can be seen that even when the concentration of the B16 chimeric antibody is low (0.001 µg/ml), the B16 chimeric antibody already has a higher affinity. IgG antibody was used as a negative control.

(3) B16 Chimeric Antibody can be Applied to Flow Cytometry Analysis

Figure 4:
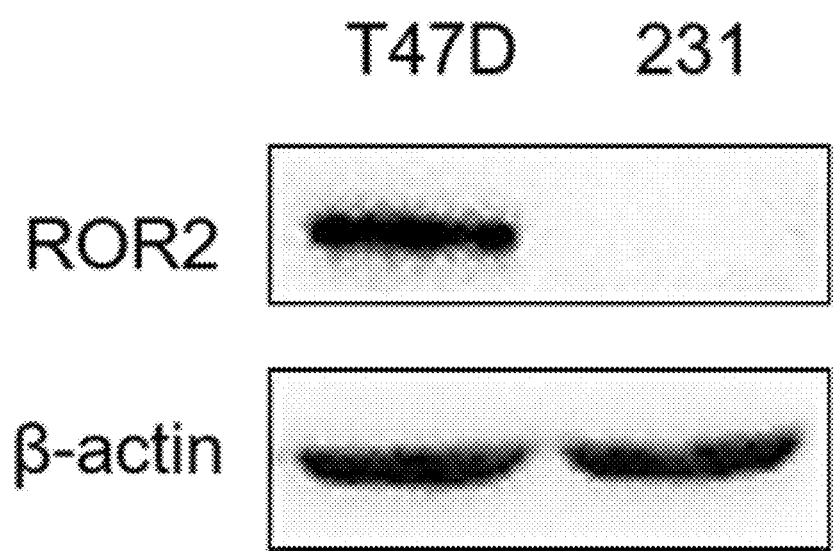
FIG. 4 is ROR2 expression levels in T-47D cells (T47D) and MDA-MB-231 cells (231) by ROR2 antibody detection according to an embodiment of the present disclosure.
Figure 5:
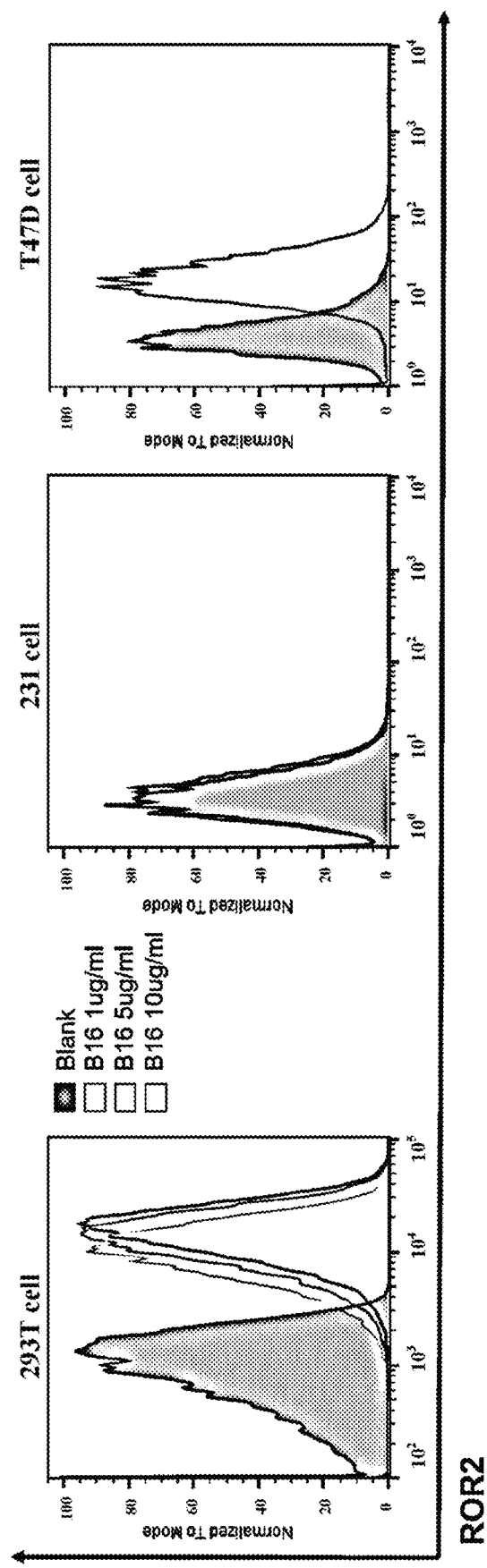
FIG. 5 is a flow cytometric analysis of the binding ability of the B16 chimeric antibody according to an embodiment of the present disclosure.

The purified B16 chimeric antibody was subjected to flow cytometry to detect the ROR2 levels of 293T cells (positive ROR2 expression), MDA-MB-231 breast cancer cells (negative ROR2 expression, FIG. 5), and T47D breast cancer cells (positive ROR2 expression, FIG. 5). The concentration of B16 chimeric antibody for detecting 293T cells was 1 µg/ml, 5 µg/ml and 10 µg/ml, respectively, and the concentration of B16 antibody for detecting MDA-MB-231 breast cancer cells and T47D breast cancer cells was 5 µg/ml. FIG. 4 shows the detection of ROR2 levels of two types of cells (T47D breast cancer cells and MDA-MB-231 breast cancer cells) with Santa cruz's ROR2 antibody (Cat. No.: sc-374174).

The flow cytometry results are shown in FIG. 5. The B16 chimeric antibody can recognize T47D cells and 293T cells with positive ROR2 expression, but cannot recognize 231 cells with negative ROR2 expression. When using different concentrations to detect 293T cells, the fluorescence intensity of the flow cytometer changes gradually, which shows that the antibody can specifically bind to the ROR2 membrane protein, and when the B16 antibody is at a lower concentration of 1 µg/ml, the flow cytometry can achieve higher sensitivity.

(4) B16 Chimeric Antibody can be Applied to Immunoprecipitation (IP)

Figure 6:
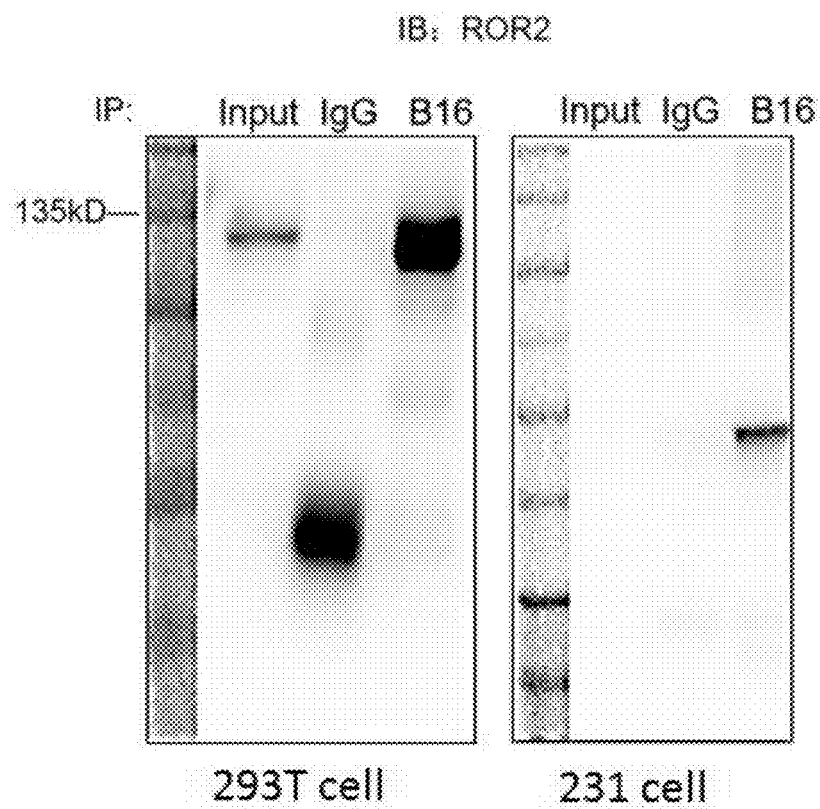
FIG. 6 is a diagram of immunoprecipitation result of the B16 chimeric antibody used for endogenous ROR2 protein according to an embodiment of the present disclosure.

In order to determine whether the B16 chimeric antibody can be applied to immunoprecipitation, 293T cells with positive ROR2 expression were used for IP, and MBA-MD-231 cells with negative ROR2 expression were used as a negative control. After two kinds of cells were lysed, B16 chimeric antibody was used for IP, and the protein after IP was immunoblotted with Santa Cruz ROR2 antibody (Cat. No.: sc-374174) to detect ROR2 protein. The results are shown in FIG. 6, after using the B16 antibody for IP, the ROR2 protein can be detected by the Santa Cruz ROR2 antibody in the western blot, indicating that the B16 chimeric antibody of the present disclosure can be used for IP and can be used for detecting endogenous ROR2. IgG antibody is used as a negative control antibody for B16 (ROR2 cannot be precipitated), and Input is a cell lysate sample that has not been performed IP (expressing ROR2 protein).

Figure 7:
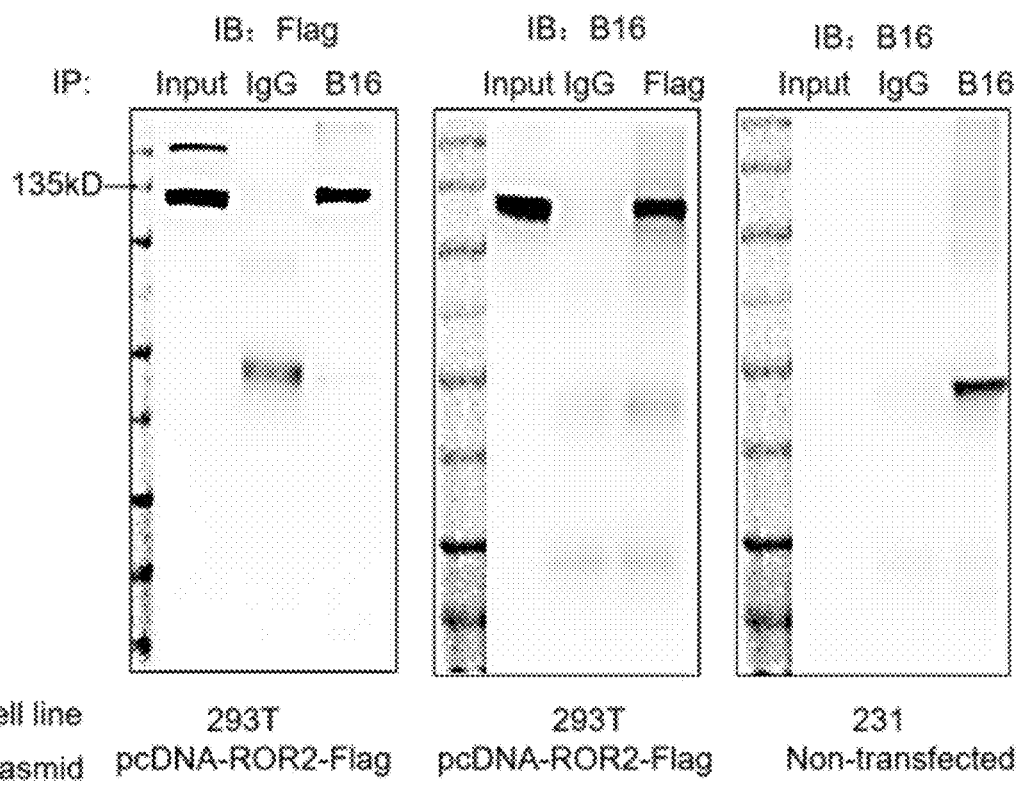
FIG. 7 is a diagram of the immunoprecipitation result of the B16 chimeric antibody according to an embodiment of the present disclosure.

To further verify whether the B16 chimeric antibody can perform IP, the ROR2 receptor of 293T cells was overexpressed (the overexpression plasmid carries the Flag tag). Then B16 chimeric antibody and Flag antibody were used for IP, and Flag antibody and B16 chimeric antibody were used for immunoblotting (IB). The results are shown in FIG. 7, showing that regardless of whether it is B16 chimeric antibody or Flag for IP, ROR2 (130 kD) bands can be detected in the IB results. IgG antibody is used as a negative control antibody for B16 (ROR2 cannot be precipitated), and Input is a cell lysate sample that has not been performed IP (expressing ROR2 protein).

The results of FIG. 6 and FIG. 7 show that whether it is an endogenous cell lysate sample or a cell lysate sample overexpressing ROR2, the B16 chimeric antibody can be used to precipitate the ROR2 protein, which shows that the B16 antibody of the present disclosure can be used for immunoprecipitation, and can be used for immunoprecipitation of endogenous and exogenous ROR2.

(5) Determination of Epitope of B16 Chimeric Antibody

In order to find the epitope bound by the B16 chimeric antibody, flag-tagged mutant plasmids (B1~B8) from different regions of the ROR2 protein were constructed (The Flag tag is a polypeptide fragment composed of eight hydrophilic amino acids shown in SEQ ID NO: 15, which can be fused with proteins without occupying protein epitopes or structural domains, avoiding affecting the function, secretion, and transport properties of the protein. The flag tag is used to mark the target protein, if the tag is expressed, the target protein will also be expressed). The plasmid used is pcDNA3.0 plasmid. The full-length sequence of human-derived ROR2 protein includes SP region, Ig-like region, CRD region, Kringle region, Kinase region, S/T1 region, Pro region and S/T2 region. Each part and the corresponding function can refer to Debebe Z, Rathmell W K. Ror2 as a Therapeutic Target in Cancer [J]. Pharmacology & Therapeutics, 2015, 150:143-148. B1~B8 correspond to a full length of the ROR2 protein (hROR2), ROR2 mutant with the deletion of the d-Ig-like region, ROR2 mutant with the deletion of the d-CRD region, ROR2 mutant with the deletion of the d-Kringle region, ROR2 mutant with the deletion of the d-Kinase region, ROR2 mutant with the deletion of the d-750 region, ROR2 mutant with the deletion of the d-S/T1 region, and ROR2 mutant with the three mutations Y641, 645, and 646F.

The amino acid sequence shown in SEQ ID NO: 15 is: DYKDDDDK.

Then PEI was used to transfect the above mutant plasmids into 293T cells. After 48 hours of expression, the cells transfected with mutant plasmids in different regions of ROR2 were lysed. By western blot, the expression of ROR2 protein was detected with B16 chimeric antibody, Flag antibody and Santa Cruz's ROR2 antibody (Cat. No.: sc-374174).

Figure 8:
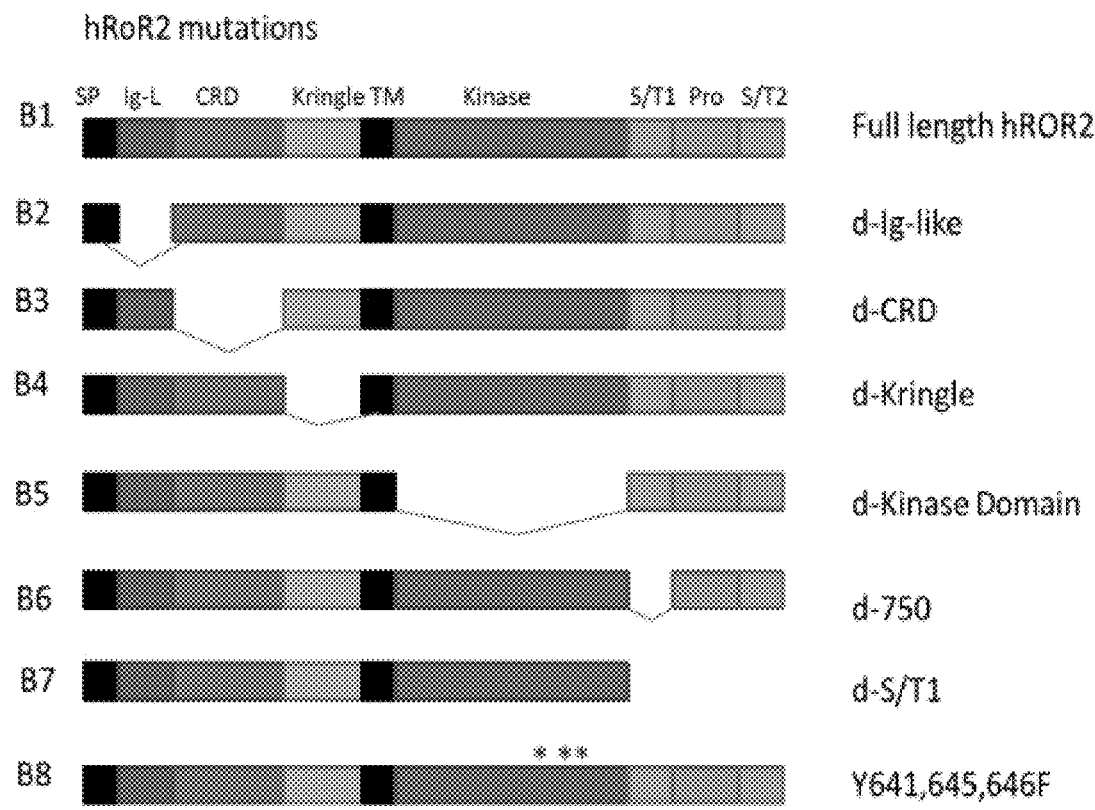
FIG. 8 is a diagram showing results of the recognition of different regions of ROR2 by the B16 chimeric antibody according to an embodiment of the present disclosure.
Figure 9:
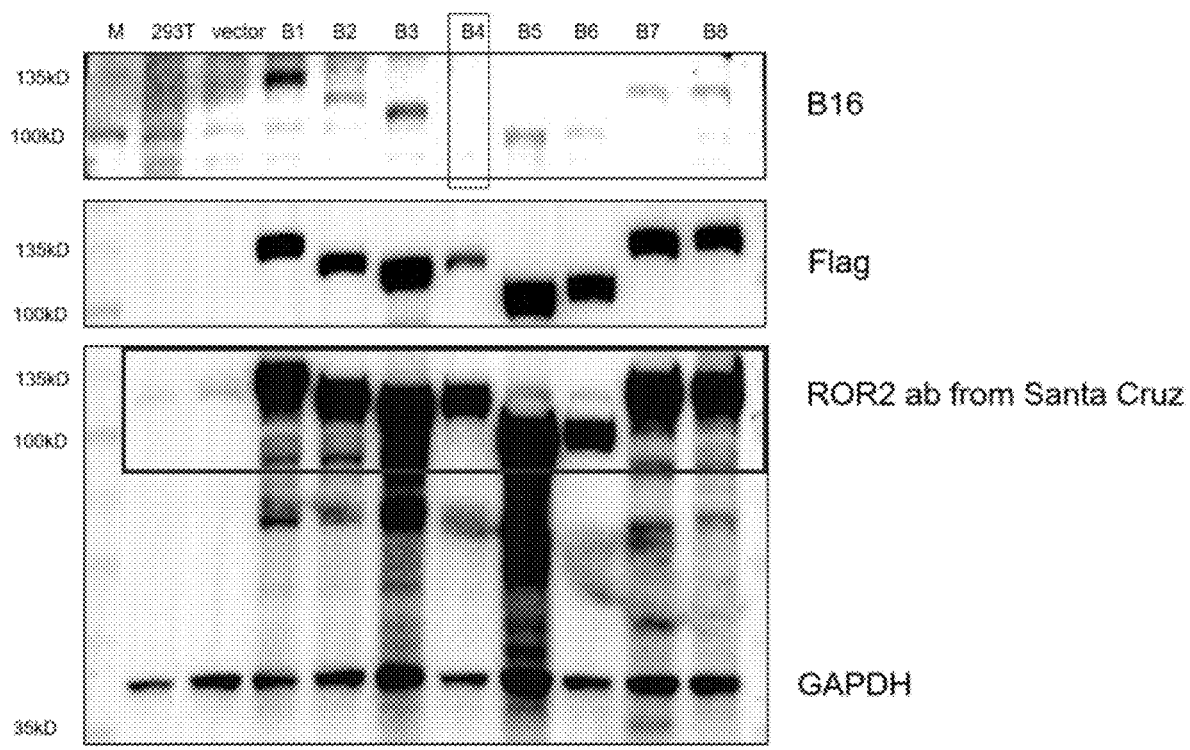
FIG. 9 is a schematic diagram of each structural region of the ROR2 mutant according to an embodiment of the present disclosure.

The results show that Flag tags could be detected in all samples transfected with plasmids, indicating that the mutant plasmids were successfully transfected into the cells. When using the B16 chimeric antibody to detect, except for the B4 area (Kringle area), other samples can detect the corresponding size band, indicating that the B16 chimeric antibody recognizes the Kringle region in the extracellular segment of ROR2 (shown in FIG. 8 and FIG. 9).

Figure 10:
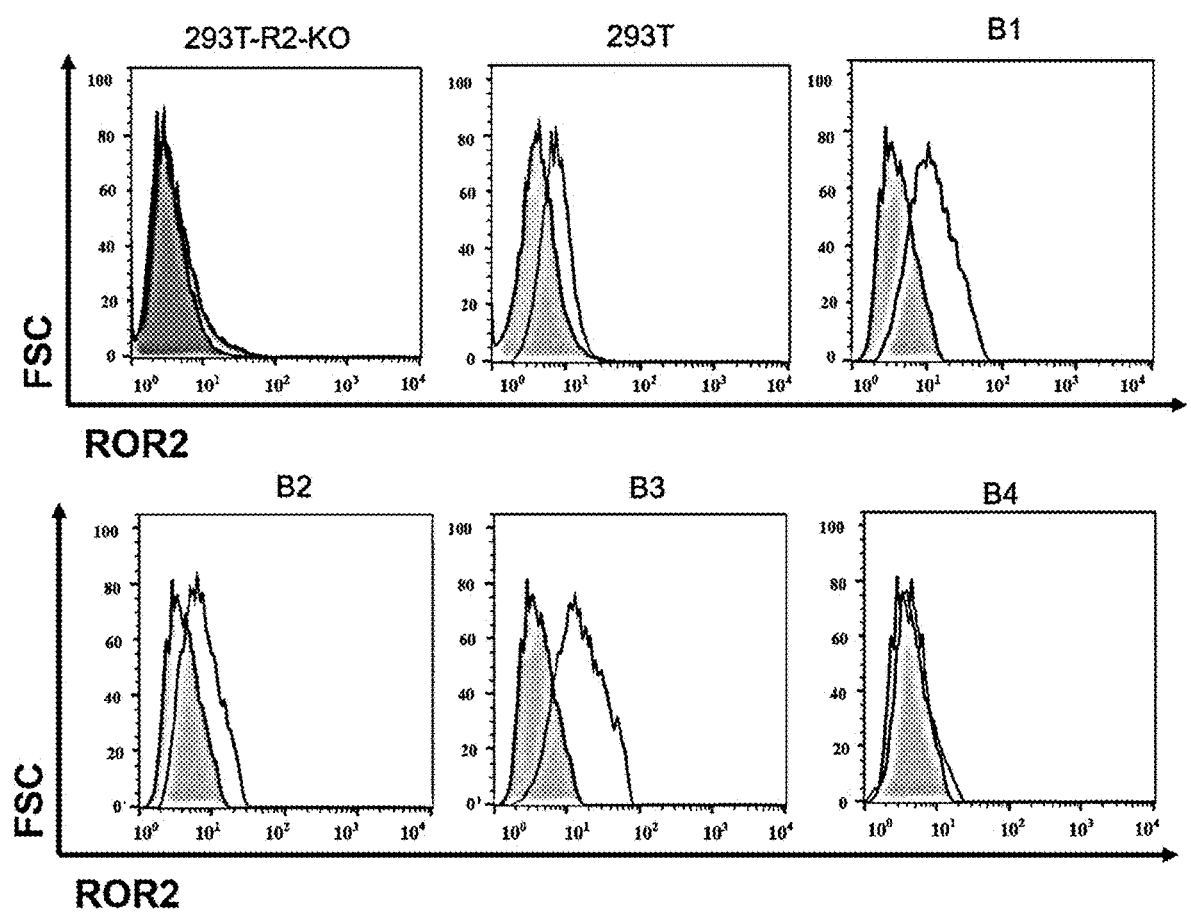
FIG. 10 is a flow cytometry diagram of B16 after 293T-R2-KO cells were transfected with different fragments of mutant plasmids according to an embodiment of the present disclosure.

In addition, 293T ROR2 knockout cells (293T-R2-KO) transfected with plasmids in different mutation regions of ROR2 were analyzed by flow cytometry. As shown in FIG. 10, the results also showed that in the extracellular region (B1-B4) of ROR2, only the B4 (Kringle region) segment was mutated, and B16 could not recognize the expressed ROR2. In summary, the B16 chimeric antibody recognizes the Kringle region of ROR2.

(6) B16 Chimeric Antibody-Dependent Cell-Mediated Cytotoxicity (ADCC)

Antibody-dependent cell-mediated cytotoxicity (ADCC) means that the Fab fragment of the antibody binds to the epitope of virus-infected cells or tumor cells. The Fc segment binds to the FcR on the surface of killer cells (NK cells, macrophages, etc.) to mediate the killer cells to directly kill target cells.

Figure 11:
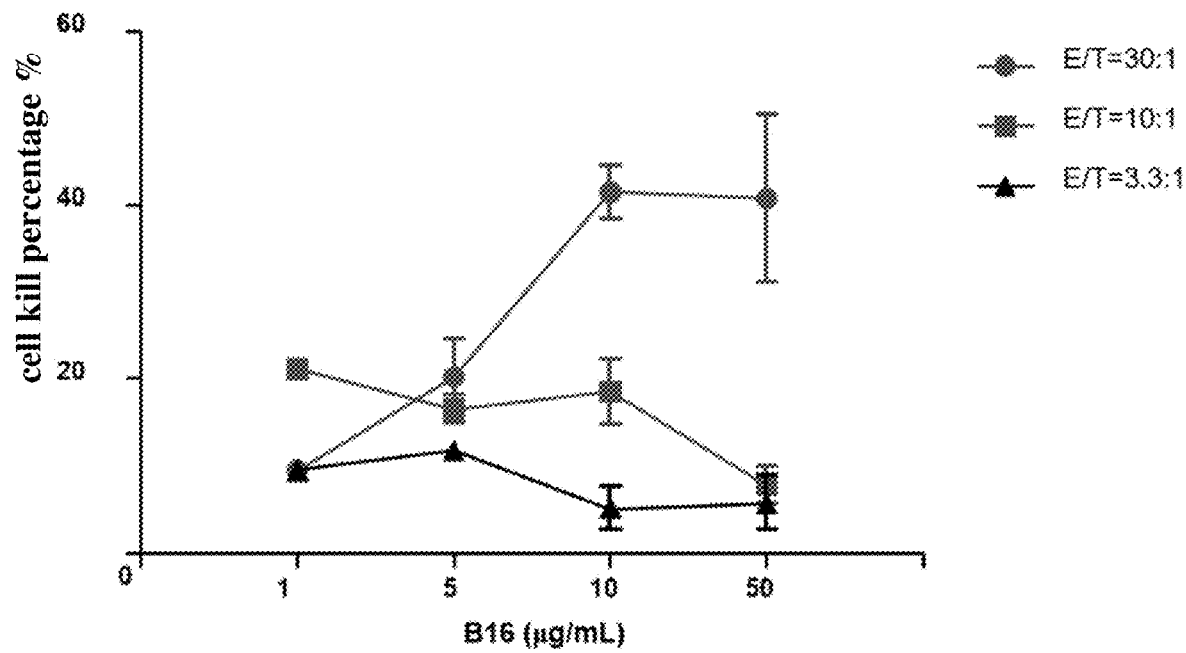
FIG. 11 is a diagram of the killing effect of B16-mediated ADCC on T47D cells according to an embodiment of the present disclosure.

The ADCC killing experiment results are shown in FIG. 11. Although when the ratios of effector cells to T cells (E/T) are 3:1 and 10:1, its ADCC killing effect is not significant, when the ratio of effector cells to T cells (E/T) is 30:1, the B16 chimeric antibody has a strong killing effect. When the antibody concentration reaches 3 μg/ml, 4.5-hour killing effect of antibody-mediated on breast cancer cells reaches 40%, indicating that the B16 antibody has ADCC effect.

(7) In Vivo Pharmacodynamics of B16 Chimeric Antibody

In order to detect the half-life of B16 antibody in animals, mice were injected with different concentrations of B16 chimeric antibody (1 mg/kg, 3 mg/kg, 10 mg/kg) into the tail vein. The sera of 1 min, 5 min, 2 h, 5 h, 1 day, 3 days, and 7 days after the injection were taken, and the concentration of the B16 chimeric antibody in the blood was detected by ELASA. The pharmacodynamic curve is shown in FIG. 12.

Figure 12:
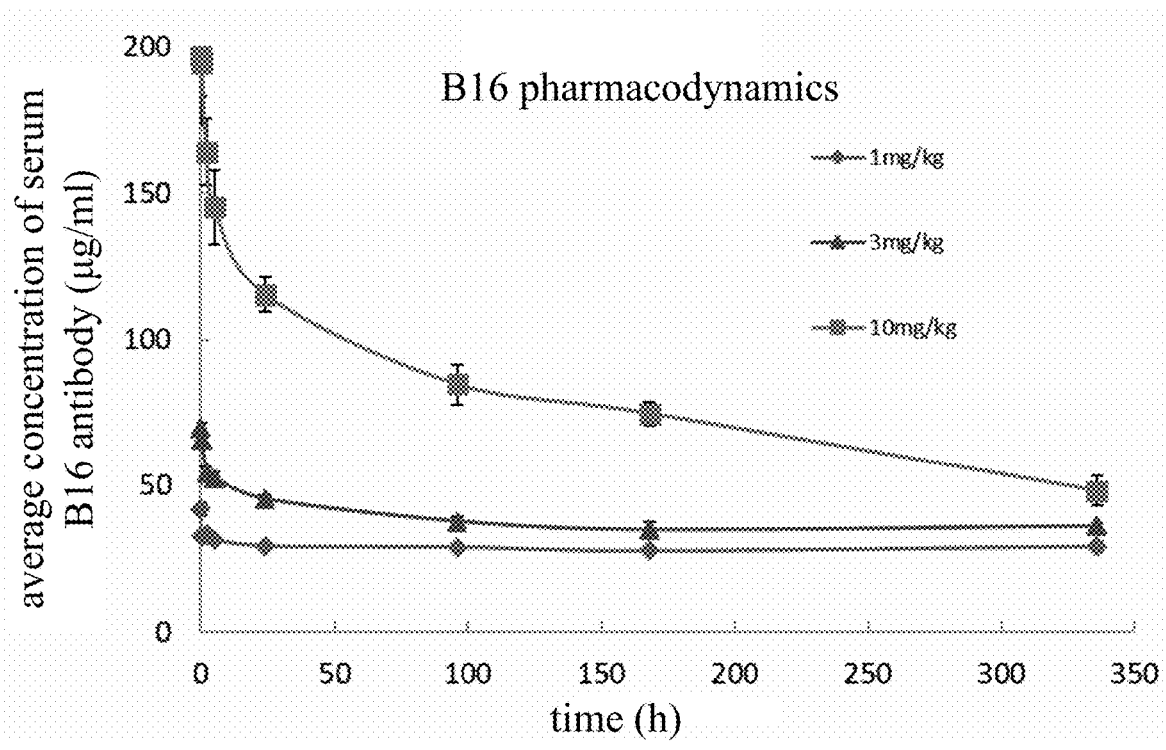
FIG. 12 is a diagram showing the results of in vivo pharmacodynamics of the B16 chimeric antibody according to an embodiment of the present disclosure.

It can be seen from FIG. 12 that as time goes by, the concentration of B16 antibody in the blood gradually decreases, and the half-life is about 50 hours. Compared with 1 g/kg, and 3 mg/kg, the injection concentration of 10 mg/kg can maintain a longer time in the blood.

It can be seen from the above experiments that the spleen of immunized mice was used to construct an immune phage library, and the high-affinity monoclonal antibody (B16 antibody) that specifically recognized ROR2 was selected for the amino acids of the variable regions of the light and heavy chains. Then the nucleotide sequence was deduced and constructed into a plasmid vector containing the Fc segment of human-related antibodies, and the B16 chimeric antibody was obtained by expression and purification. The affinity and diagnostic function of the B16 chimeric antibody were characterized, and the epitope of the B16 chimeric antibody was obtained by analysis.

In short, using the immune library to screen specific antibodies can get as many different antibody sequences as possible, which provides powerful conditions for finding functional monoclonal antibodies. At the same time, through the detection of diagnostic functions, antibodies that specifically recognize ROR2 can be screened to help clinically accurately diagnose tumor cells, which will lay the foundation for future clinical treatment of ROR2-positive tumor patients, and provide biomarkers for predicting the patient's response to drugs in future clinical trials.

Embodiment 3 Functional Test of B16 Chimeric Antibody

Functional screening experiments further verified that the B16 chimeric antibody can inhibit the biological function of the monoclonal antibody that inhibits the activity of ROR2 positive cells. Specifically, by using the spheroid formation experiments, invasion experiments, and tumor growth, metastasis and recurrence models of the PDX mouse model that have been established in our laboratory, functional ROR2 antibodies that can inhibit tumor cells forming spheroids and inhibit tumor cell invasion and tumorigenesis were screened.

(1) The Effect of B16 Chimeric Antibody on the Invasion Ability of Breast Cancer Cell Line T47D The breast cancer cell line T47D highly expresses ROR2. When shRNA was used to knock down the expression of ROR2, fewer cells passed through Matrigel in the ROR2 knockdown group at 36 hours compared to the control group. After incubating with T47D cells with different concentrations of B16 chimeric antibody for half an hour, both the 5 μg/ml group and the 50 μg/ml group can significantly reduce the number of cells passing through the matrigel in 36 hours, indicating that the B16 chimeric antibody can inhibit the invasion ability of breast cancer cell T47D to Matrigel. The experimental results are shown in FIG. 13 to FIG. 14.

Figure 13:
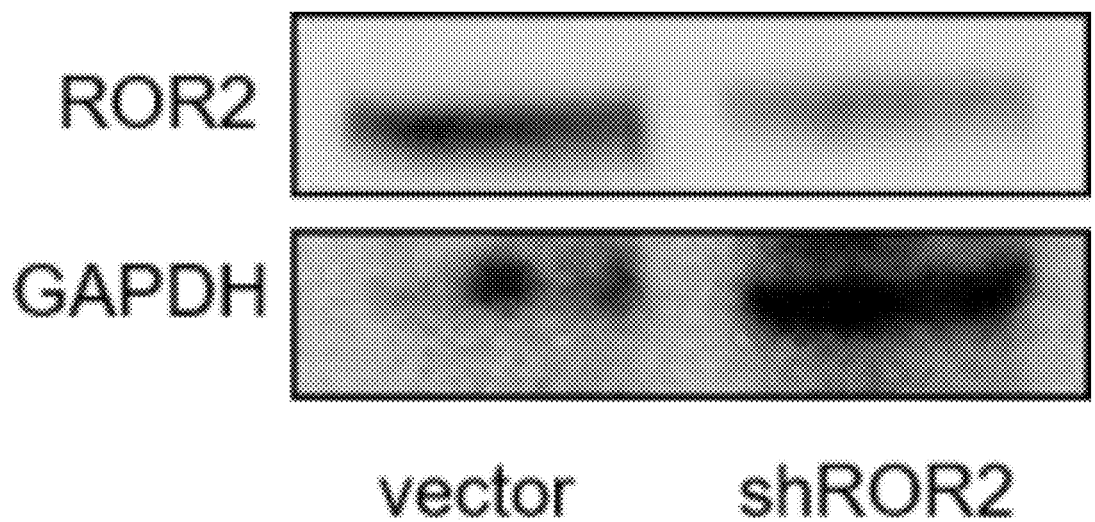
FIG. 13 is a diagram showing the results of immunoblotting according to an embodiment of the present disclosure.

In FIG. 13, vector represents the cells transfected with the empty plasmid group, and shROR2 represents the cells transfected with the shRNA plasmid group. The result of immunoblotting indicates that shRNA can effectively reduce the expression of ROR2 in T47D cells.

Figure 14:
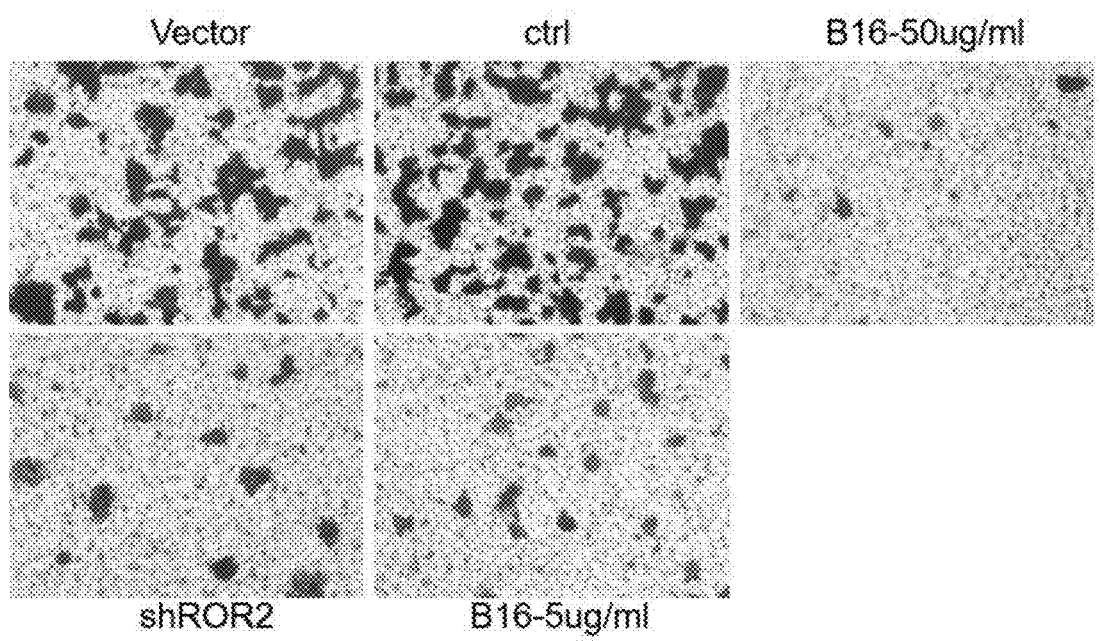
FIG. 14 is a microscopic diagram of the invasion experiment of breast cancer cell line T47D treated with different concentrations of B16 chimeric antibody according to an embodiment of the present disclosure.

FIG. 14 is an optical microscope image of cells passing through the Transwell chamber, vector represents the cells transfected with the empty plasmid group that passed through the chamber, shROR2 represents the cells transfected with the shRNA plasmid group that passed through the chamber, ctrl represents the cells passing through the chamber in the PBS treatment group, and B16-5 μg/ml and B16-50 μg/ml represent the cells passing through the chamber in the B16 treatment group at 5 μg/ml and 50 μg/ml, respectively.

Figure 15:
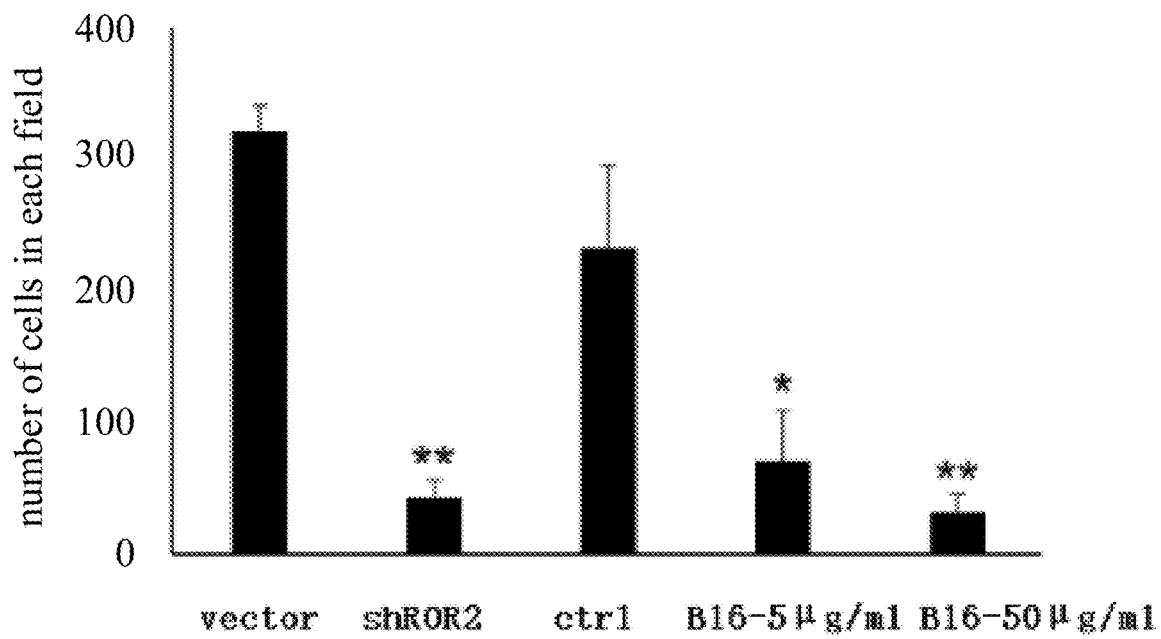
FIG. 15 is a diagram of cell counts in the invasion experiment of breast cancer cell line T47D treated with different concentrations of B16 chimeric antibody according to an embodiment of the present disclosure.

FIG. 15 represents the average number of T47D cells per field of view of the cells passing through the chamber in each of the above groups.

(2) The Effect of B16 Chimeric Antibody on the Invasion Ability of Primary Cells of Patient-Derived Tumor Transplantation Tissue (PDX)

Figure 16:
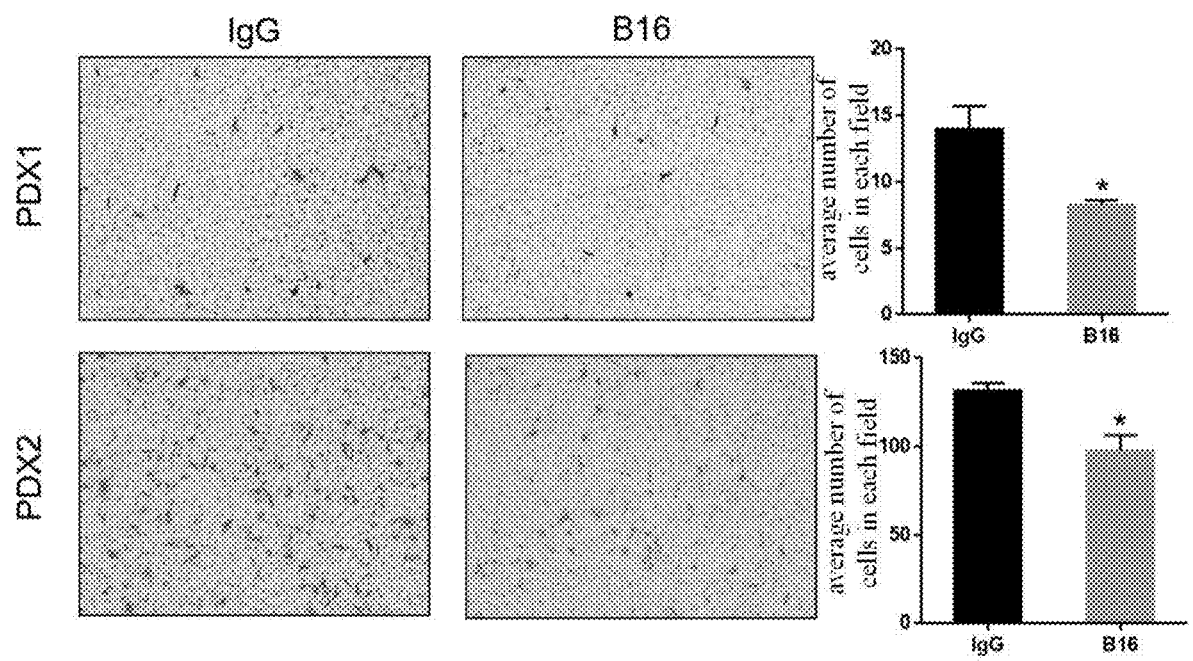
FIG. 16 is a diagram showing the effect of B16 chimeric antibody on the invasion ability of primary cells of patient-derived xenograft (PDX) tissue according to an embodiment of the present disclosure.

After taking out the PDX tumor tissues grown from immunodeficient mice, the tissues were separated into single cells with the Human Dissociation kit. 100,000 single cells were taken and pre-incubated with B16 chimeric antibody or control IgG for half an hour. Then the cells were added to the Transwell chamber with Matrigel (10:1). The cell suspension was diluted with MBGM without growth factors and serum, and NIH 3T3 cell specific medium (the medium collected by NIH3T3 cells cultured for 24 hours without serum) was added to the lower chamber. After 24 hours, the cells passing through the Matrigel to the bottom of the well were observed and counted. The results are shown in FIG. 16, demonstrating that after the B16 chimeric antibody treatment, the number of PDX single cells from the two patients passing through the matrigel was significantly lower than that of the IgG control group, indicating that the B16 chimeric antibody can significantly reduce the invasion ability of PDX cells.

(3) Effect of B16 Chimeric Antibody on the Invasion Ability of Lymphoma Cell Line Jeko-1

The flow cytometry results of B16 antibody detection of lymphoma cell line Jeko-1 showed that Jeko-1 highly expressed ROR2 protein. After incubating with 50 μg/ml B16 chimeric antibody and Jeko-1 (8*104) for half an hour, the number of cells passing through the 5 μm pore size chamber was significantly less than that of the IgG group and the untreated group. The results are shown in FIG. 17, indicating that the B16 antibody significantly inhibited the invasion ability of the lymphoma cell line Jeko-1.

Figure 17:
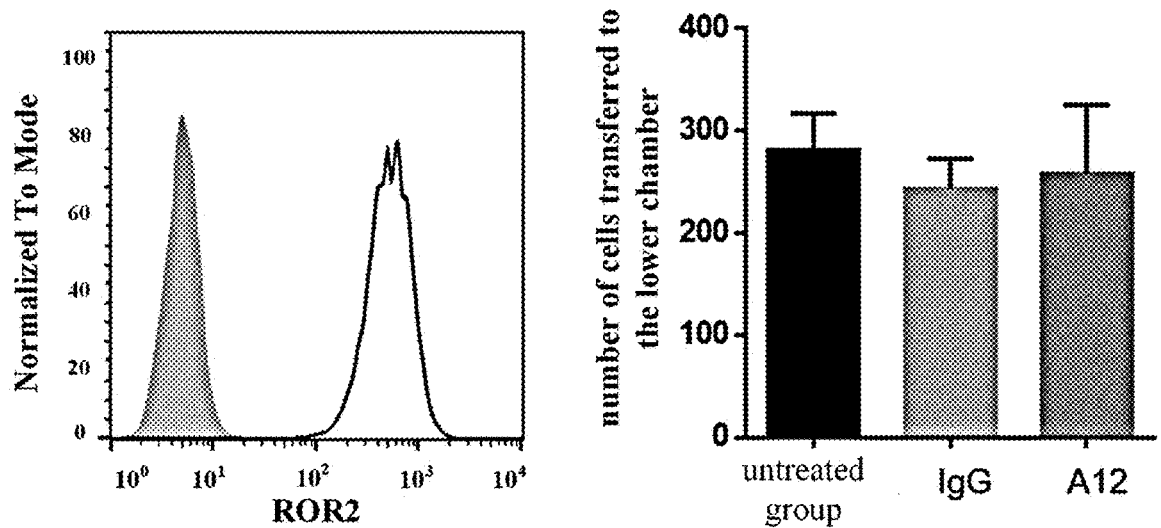
FIG. 17 is a diagram showing the effect of the B16 chimeric antibody on the invasion ability of the lymphoma cell line Jeko-1 according to an embodiment of the present disclosure.

The results are shown in FIG. 17. The control group in the histogram on the right of FIG. 17 represents no treatment, and the abscissa of the histogram represents the number of cells passing through the chamber.

Figure 18:
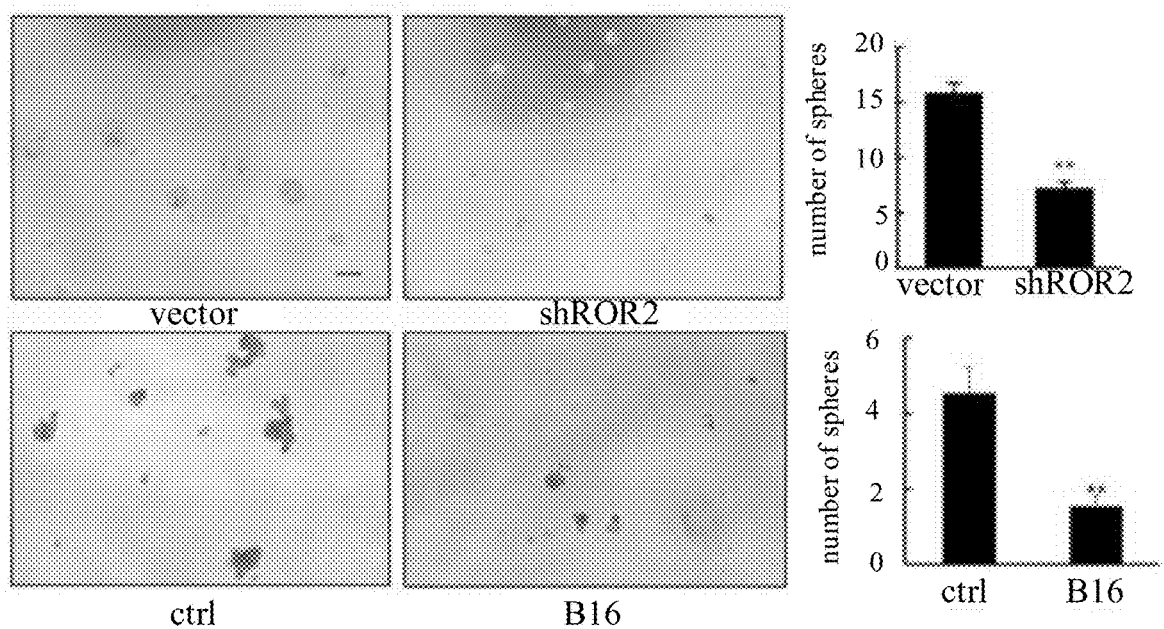
FIG. 18 is a diagram showing the effect of B16 chimeric antibody on the spheroid formation ability of breast cancer cell T47D according to an embodiment of the present disclosure.

(4) Effect of B16 Chimeric Antibody on the Spheroidization Ability of Breast Cancer Cell T47D The spheroidization experiment is to use growth factor-rich medium MEGM to culture tumor cells digested into single cells in a low-adhesion culture plate. The ability of the single cell to form a sphere was observed. The stronger the ability of the cell to form a sphere, the stronger the stemness of the tumor cell. When shRNA was used to knock down the ROR2 level of breast cancer T47D cells, the number of cell spheres formed in the shROR2 group was significantly less than that of the control plasmid group. Similarly, when 50 µg/ml B16 chimeric antibody was added to normal T47D MEGM medium, after two weeks of culture, the number of cell spheres formed in the antibody treatment group was significantly less than that of the control IgG group, indicating that the B16 chimeric antibody can effectively inhibit the spheroidization ability of breast cancer cell line T47D. The results are shown in FIG. 18.

(5) Effect of B16 Chimeric Antibody on the Organoid Formation Ability in Breast Cancer Tissues of Patients Organoids are miniaturized and simplified organs that display the true microscopic anatomy in three dimensions in vitro. They come from one or several cells from tissues, embryonic stem cells or induced pluripotent stem cells. Due to their self-renewal and differentiation capabilities, they can be cultured in vitro, and the cell spheres obtained by culture are closer to the cell state in the human body.

Figure 19:
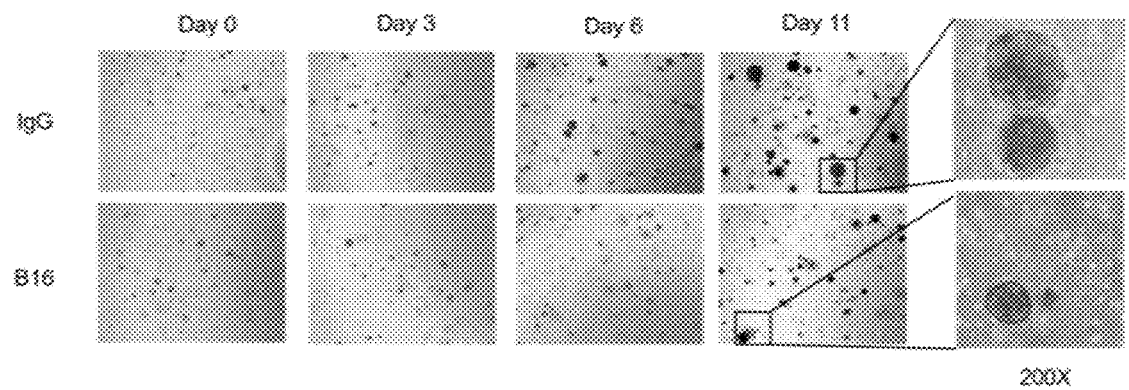
FIG. 19 is a diagram showing the effect of B16 chimeric antibody on organoids according to an embodiment of the present disclosure.

After obtaining the tissue of the breast cancer patient, the tissue was digested with collagenase (1-2 mg/ml) for 2 hours. The digested cell suspension was filtered with a 100 µm sieve to remove large particles and undigested tissues. The sieved cells were added with 10 ml DMEM/AF12 and centrifuged at 400 g for 10 min. The supernatant was discarded, Matrigel without phenol red was added, and the cells were mixed. The Matrigel mixed with cells was added to a 24-well plate preheated for half an hour, and then put into the incubator. After half an hour, the medium BCOM containing various growth factors was added. After the Organoid was established, the expression of ROR2 was detected, and then the Organoid was subcultured, and 50 µg/ml B16 chimeric antibody or control IgG was added to the culture medium, and the growth of Organoid was regularly observed. The results are shown in FIG. 19. The growth of organoid in breast cancer tissues of the B16 chimeric antibody group was slower and the volume was smaller than that of the IgG group.

Figure 20:
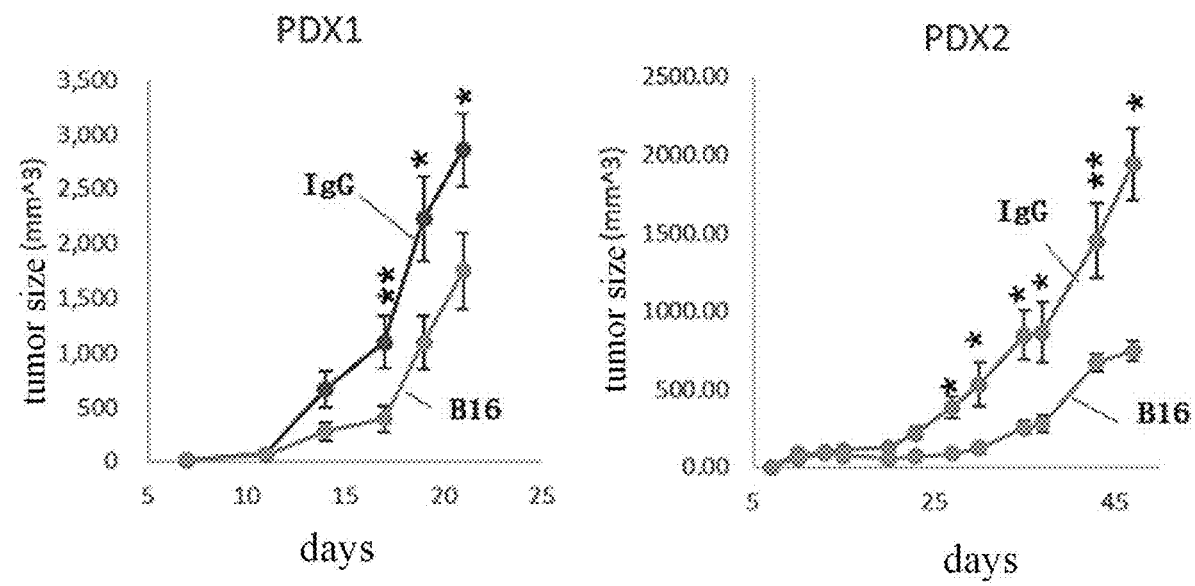
FIG. 20 is a diagram showing changes in tumor size in mice after immunization with B16 chimeric antibody according to an embodiment of the present disclosure.
Figure 21:
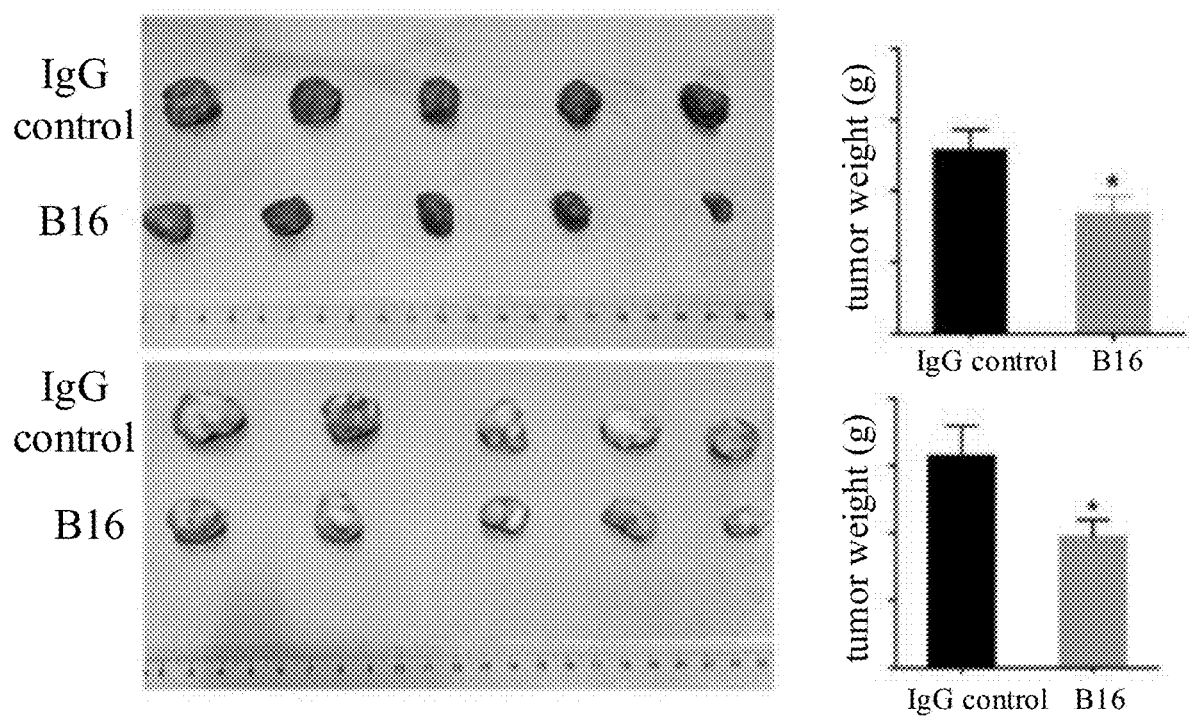
FIG. 21 is a diagram showing changes in tumor weight in mice after immunization with B16 chimeric antibody according to an embodiment of the present disclosure.

(6) B16 Chimeric Antibody Inhibits the Growth of PDX Tumors in Immunodeficient Mice In order to verify whether the B16 chimeric antibody has an inhibitory effect on tumor growth in vivo, a PDX mouse model was first established, then the mice was divided into two groups, tail vein injection of B16 chimeric antibody (10 mg/kg) or control IgG was performed on the mice and the size of the tumor tissue was measured regularly. The growth curve of the tumor tissue is shown below. The results are shown in FIG. 20 and FIG. 21, indicating that the B16 chimeric antibody can significantly inhibit the growth of PDX in immunodeficient mice. When the tumor was large enough, it was removed and its weight was measured. The results shows that the tumor size of the experimental group after treatment with the B16 chimeric antibody was significantly smaller than that of the control group.

Figure 22:
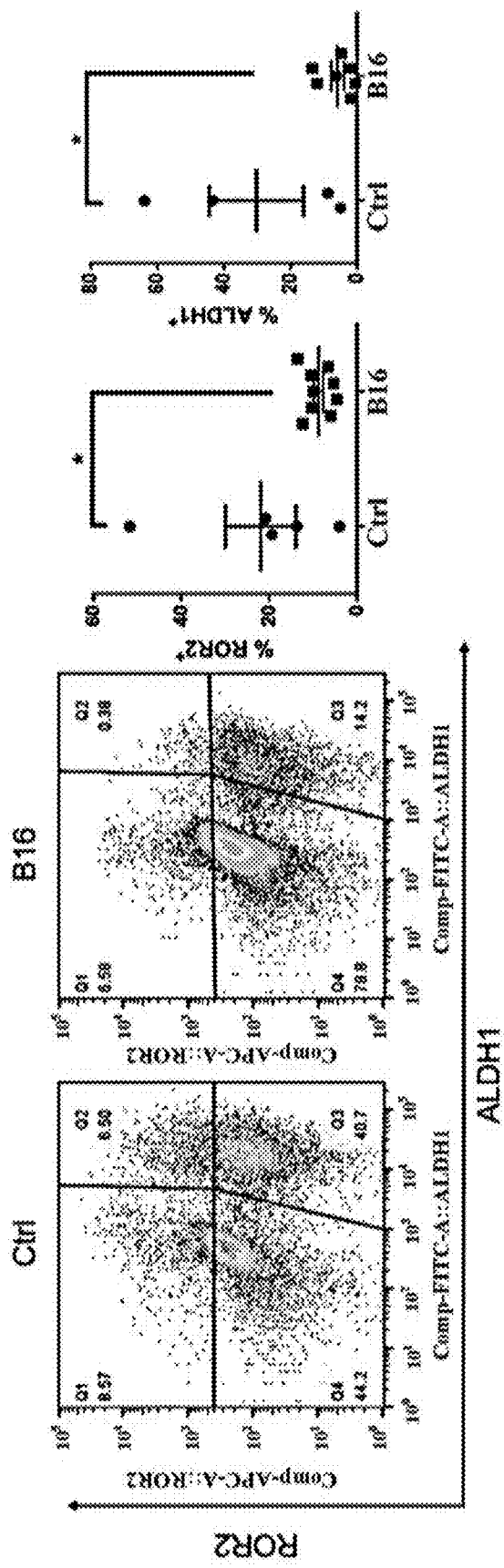
FIG. 22 is a diagram showing the results of detection of PDX tumor cells after treatment with B16 chimeric antibody according to an embodiment of the present disclosure.
Figure 23:
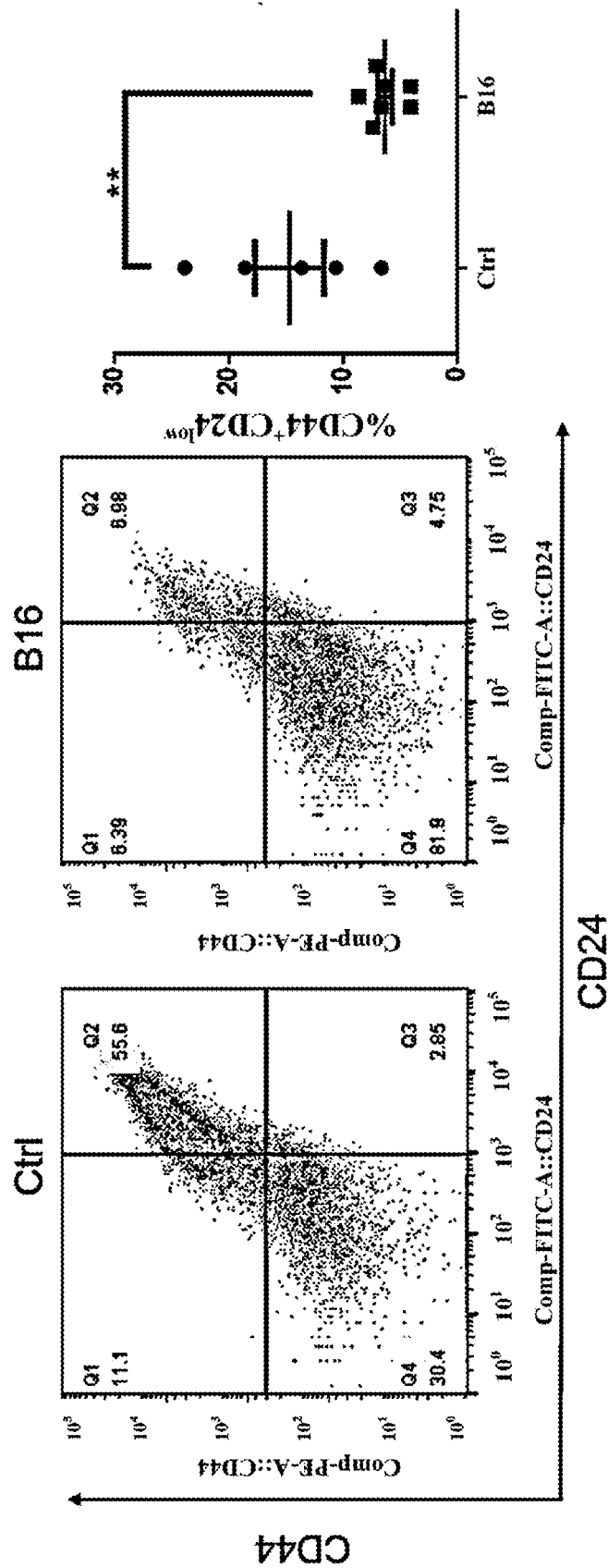
FIG. 23 is a diagram showing the detection results of PDX tumor cells after treatment with B16 chimeric antibody according to an embodiment of the present disclosure.

After the tumor tissue was removed, the tissue was digested into single cells with the human Tumor Dissociation kit, and the flow cytometric analysis of the ALDH1 and CD44+/CD24$^{Low}$ cell populations, which are the markers of tumor stem cells, was performed. The results are shown in FIG. 22 and FIG. 23. After B16 chimeric antibody treatment, ALDH1+ cell population and ROR2+ cell population were significantly reduced. At the same time, the CD44+/CD24$^{Low}$ cell population was also significantly reduced, indicating that the B16 chimeric antibody can kill a part of the cell population with stem cell characteristics.

FIG. 22 shows that after B16 antibody treatment, ALDH1+ cell population and ROR2+ cell population in PDX tumor cells were significantly reduced. FIG. 23 shows that after B16 antibody treatment, the CD44+/CD24$^{Low}$ cell population in PDX tumor cells was significantly reduced.

Since the primary cells used in the PDX model are patient cells with very few passages, the PDX mouse model is used for tumor stem cell research and targeted immune drug screening, which can simulate the effects of drugs in the body closer to the physiological state of the patient's own body. Compared with traditional cell lines to study biological phenomena and drug screening, the results are more valuable.

Embodiment 4

The second-generation CAR sequence was used to construct ROR2-CAR with the high-affinity anti-ROR2 antibody B-16.

1. CAR Structure

Figure 24:
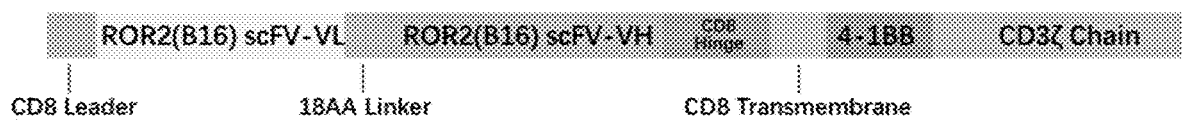
FIG. 24 is a diagram showing the results of B16-CAR according to an embodiment of the present disclosure.

B16 CAR is composed of CD8 leader, B16 scFv-VL, 18 amino acid linker, B16 scFv-VH, CD8 hinge region, CD8 transmembrane region, 4-1BB costimulatory factor structure, and CD32 chain structure, as shown in FIG. 24.

2. CAR-T can Bind to ROR2

Ficoll was used to extract human lymphocytes from fresh human blood samples and the lymphocytes were infected with CarT-B16 virus. After 48 hours, the B16-CAR-T cells were incubated with biotinylated ROR2 protein at a final concentration of 2 µg/ml for 30 minutes on ice. Then, the ROR2 protein was labeled with affinity streptomycin with PE fluorescence and placed on ice for 15 minutes. Flow cytometry was used to detect the ratio of CAR-T that can bind to the ROR2 protein.

Figure 25:
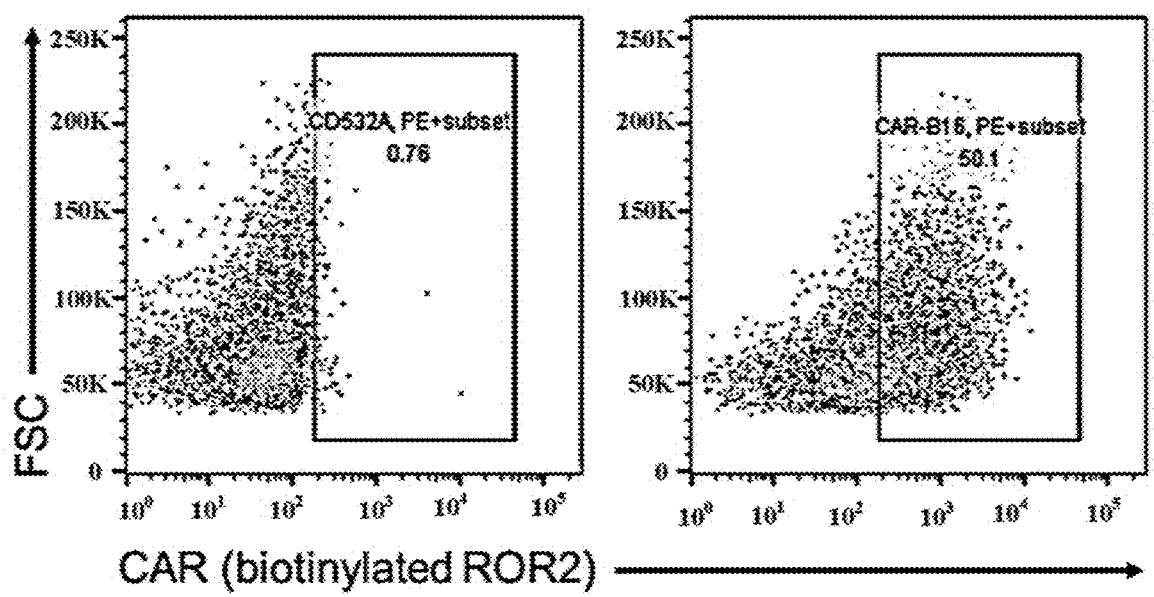
FIG. 25 is a diagram showing the results of flow cytometric detection of lymphocytes capable of expressing CAR-T according to an embodiment of the present disclosure.

The flow cytometry results are shown in FIG. 25, indicating that 50.1% of lymphocytes express B16-CarT.

3. CAR-T Kills Target Cells In Vitro

Figure 26:
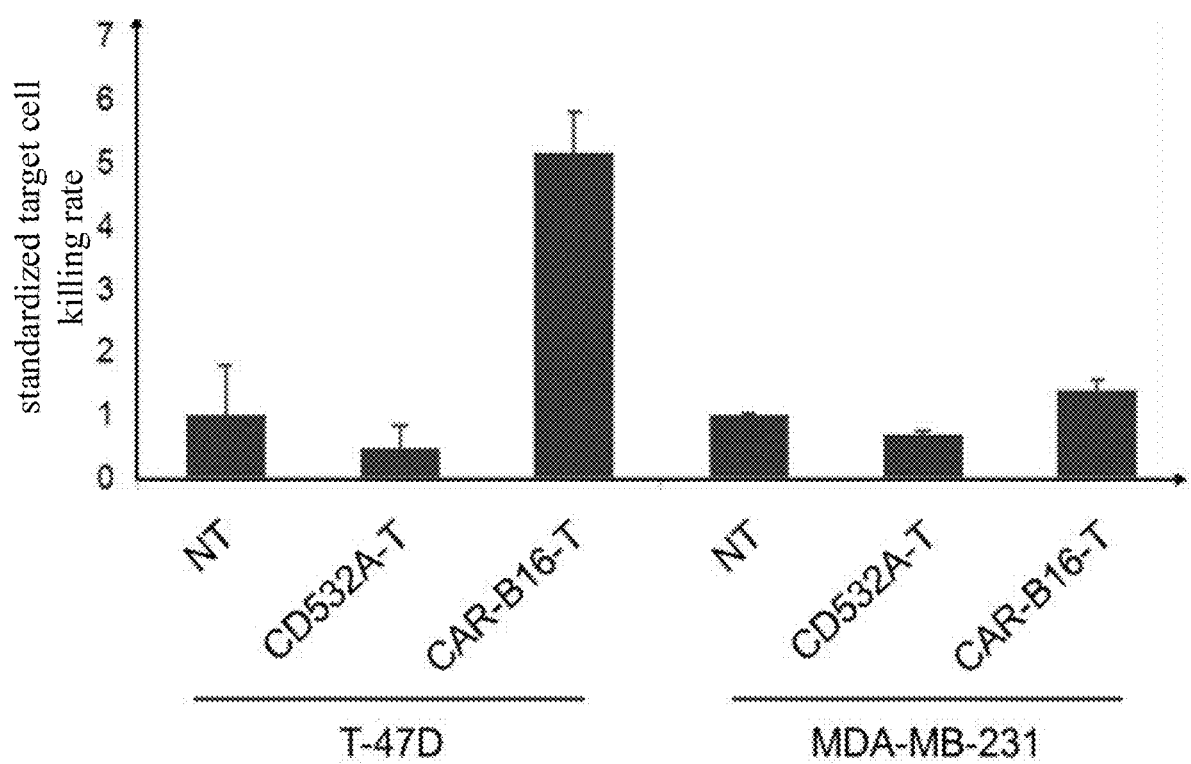
FIG. 26 is a diagram showing the cytotoxicity test results of CAR-T lymphocytes according to an embodiment of the present disclosure.

Untransfected T cells (NT), transfected empty-CD532A-vector T, and transfected B16-CAR-vector T cells were co-cultured with two different target cells in 96-well plates, respectively. One of the target cells is the T47D breast cancer cell line that expresses ROR2, and the other of the target cells is the MDA-MB-231 breast cancer cell line that does not express ROR2. 12,000 target cells and 120,000 effect T cells per well, effect (E): target (T)=10:1, were cultured for 12 hours, and then the lactate dehydrogenase release test was used to detect the killing of the target cells. The killing rate is calculated according to the formula % cytotoxicity=(experimental group-spontaneous effector cell-spontaneous target cell)/(maximum target cell-spontaneous target cell)×100. The resulting kill rate is then standardized on the basis of the kill rate of the target cells in the untransformed T cell (NT) group. The results are shown in FIG. 26, indicating that B16-CAR-T can significantly kill T47D cells with positive ROR2 expression, but cannot kill MDA-MB-231 cells with negative ROR2 expression.

Using the high-affinity ROR2 antibodies screened out, the ROR2-CAR T cell therapy technology was developed, which can be used for targeted therapy of diseases.

In the description of the specification, the description of the terms "an embodiment", "some embodiments", "example", "specific example", or "some examples" means that the specific features, structures, materials, or characteristics described in combination with the embodiment or example are included in at least one embodiment or example of the present disclosure. In this specification, the schematic representations of the above-mentioned terms are not necessarily directed to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other.

Although the embodiments of the present disclosure have been shown and described above, it can be understood that the above-mentioned embodiments are exemplary and should not be construed as limiting the present disclosure. Those of ordinary skill in the art can make changes, modifications, substitutions and modifications to the above-mentioned embodiments within the scope of the present disclosure.

What is claimed is:

1. An anti-ROR2 antibody or antigen-binding fragment, comprising:
   a light chain variable domain and/or a heavy chain variable domain,
   wherein the light chain variable domain comprises a CDR L1 as set forth in SEQ ID NO: 1, a CDR L2 as set forth in SEQ ID NO: 2, and a CDR L3 as set forth in SEQ ID NO: 3, and wherein the heavy chain variable domain comprises a CDR H1 as set forth in SEQ ID NO: 4, a CDR H2 as set forth in SEQ ID NO: 5, and a CDR H3 as set forth in SEQ ID NO: 6;
   wherein an epitope of the antibody or antigen-binding fragment is located within a Kringle domain of the extracellular region of ROR2.

2. A polynucleotide encoding the antibody or antigen-binding fragment of claim 1.

3. An expression vector, comprising:
   the polynucleotide of claim 2; and
   a control element, which includes at least one of the following: a promoter, an enhancer, and a terminator, and is operably connected to the polynucleotide for controlling expression of the polynucleotide in a host cell.

4. A recombinant cell, comprising the expression vector of claim 3.

5. A method for preparing an anti-ROR2 antibody or antigen-binding fragment, comprising culturing the recombinant cell of claim 4.

6. A pharmaceutical composition, comprising: the antibody or antigen-binding fragment of claim 1 and a pharmaceutically acceptable carrier.

7. An anti-ROR2 chimeric antigen receptor, comprising: an extracellular domain, a transmembrane domain and an intracellular domain,
wherein the extracellular domain includes the antibody or antigen-binding fragment of claim 1, and the antibody or antigen-binding fragment is a single chain.

8. A CAR-T cell, wherein the CAR-T cell expresses the anti-ROR2 chimeric antigen receptor of claim 7.

9. The anti-ROR2 antibody or antigen-binding fragment of claim 1, wherein the light chain variable region and/or the heavy chain variable region comprises an amino acid sequence that has at least one conservative amino acid substitution in any of the CDRs relative to an amino acid sequence as set forth in SEQ ID NOs: 1, 2, 3, 4, 5, or 6.

10. A polynucleotide encoding the antibody or antigen-binding fragment of claim 9.

11. An expression vector, comprising:
the polynucleotide of claim 10; and
a control element, which includes at least one of the following: a promoter, an enhancer, and a terminator, and is operably connected to the polynucleotide for controlling expression of the polynucleotide in a host cell.

12. A recombinant cell, comprising the expression vector of claim 11.

13. A method for preparing an anti-ROR2 antibody or antigen-binding fragment, comprising culturing the recombinant cell of claim 12.

14. A pharmaceutical composition, comprising: the polynucleotide of claim 2 and a pharmaceutically acceptable carrier.

15. A pharmaceutical composition, comprising: the recombinant cell of claim 4 and a pharmaceutically acceptable carrier.

16. A pharmaceutical composition, comprising: the antibody or antigen-binding fragment of claim 9 and a pharmaceutically acceptable carrier.

17. A pharmaceutical composition, comprising: the polynucleotide of claim 10 and a pharmaceutically acceptable carrier.

18. A pharmaceutical composition, comprising: the recombinant cell of claim 12 and a pharmaceutically acceptable carrier.

* * * * *